(12) United States Patent
Nakase

(10) Patent No.: US 8,301,012 B2
(45) Date of Patent: Oct. 30, 2012

(54) IMAGE REPRODUCING APPARATUS FOR REPRODUCING IMAGES RECORDED IN ACCORDANCE WITH DIFFERENT RULES AND CONTROL METHOD THEREFOR

(75) Inventor: Yuichi Nakase, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1506 days.

(21) Appl. No.: 11/673,629

(22) Filed: Feb. 12, 2007

(65) Prior Publication Data
US 2007/0189721 A1 Aug. 16, 2007

(30) Foreign Application Priority Data

Feb. 15, 2006 (JP) ................. 2006-038482

(51) Int. Cl.
*H04N 9/80* (2006.01)
*H04N 5/93* (2006.01)
(52) U.S. Cl. .......... 386/248; 386/239; 386/353
(58) Field of Classification Search .......... None
See application file for complete search history.

(56) References Cited

U.S. PATENT DOCUMENTS

| 6,445,459 | B1 | 9/2002 | Kawaura | |
|---|---|---|---|---|
| 2004/0263644 | A1* | 12/2004 | Ebi | 348/231.2 |
| 2005/0237391 | A1 | 10/2005 | Shibuya et al. | |

FOREIGN PATENT DOCUMENTS

| JP | 2000-276582 A | 10/2000 |
|---|---|---|
| JP | 2000276582 A * | 10/2000 |
| JP | 2002-049634 | 2/2002 |
| KR | 2004-0031009 A | 4/2004 |
| WO | 2004-003907 A | 1/2004 |

OTHER PUBLICATIONS

The above references were cited in a Mar. 26, 2008 Korean Office Action issued in the counterpart Korean Patent Application 10-2007-0015237.
The above references were cited in a Search Report issued on Dec. 15, 2009, concerning the corresponding European Patent Application No. 07002849.3.
The above foreign patent document was cited in a Sep. 6, 2010 Japanese Office Action, that issued in Japanese Patent Application No. 2006-038482.

* cited by examiner

*Primary Examiner* — William C Vaughn, Jr.
*Assistant Examiner* — Heather Jones
(74) *Attorney, Agent, or Firm* — Cowan, Liebowitz & Latman, P.C.

(57) ABSTRACT

An image reproducing apparatus which reproduces image files stored in a recording medium, comprising: a retrieving unit adapted to separately retrieve for a first image group recorded in accordance with a first file rule and a second image group nonconforming to the first file rule; a determination unit adapted to determine a reproducing order for an image group which has been completely retrieved by the retrieving unit upon discriminating the first image group and the second image group; and a reproducing unit adapted to reproduce an image group for which the reproducing order is determined, wherein the retrieving unit starts retrieving for the second image group when finishing retrieving for the first image group, and the reproducing unit reproduces an image group, which has completely been retrieved by the retrieving unit, in a reproducing order determined by the determination unit.

6 Claims, 19 Drawing Sheets

IMAGE REPRODUCING APPARATUS FOR REPRODUCING IMAGES RECORDED IN ACCORDANCE WITH DIFFERENT RULES AND CONTROL METHOD THEREFOR

BACKGROUND OF THE INVENTION

1. Field of the Invention

The present invention relates to a technique of reproducing images stored in a recording medium.

2. Description of the Related Art

Conventionally, as an image reproducing technique of reproducing images stored in a recording medium, there is a technique of reproducing images stored in a recording medium according to a predetermined file system rule, i.e., in file order or a chronological order, regardless of the directory structure in the recording medium. There is also a technique which is programmed to recognize a predetermined directory structure in advance, and reproduces only images matching a predetermined directory structure. In addition, as disclosed in Japanese Patent Laid-Open No. 2002-049634, a technique which allows to change a directory structure of files to be reproduced.

In the above image reproducing techniques, a recording medium often stores, in a mixed state, images conforming to a specific directory structure, e.g., DCF images, and other kinds of images, e.g., images which the user arbitrarily copies into the recording medium and images conforming to a different directory structure. In this case, the above techniques do not allow performing proper image selection or determining of a reproducing order.

When images stored in a recording medium are reproduced according to a predetermined file system rule, e.g., a file order or a chronological order, regardless of a specific directory structure, images conforming to the specific directory structure mix with other kinds of images. This makes it difficult to specify a particular image.

In addition, when the user is to rearrange images, the user cannot specify an image to be reproduced first unless acquiring the file system information of all the images.

Furthermore, an image processing apparatus designed to recognize only a specific directory structure cannot reproduce images which the user arbitrarily copied or images recorded based on another directory structure.

Note that DCF stands for Design Rule for camera File system, which is a unified recording format for digital cameras. DCF defines a directory structure and a file naming rule which are used in image recording on a memory card. Exif (Exchangeable Image File Format) is used as an image recording format.

SUMMARY OF THE INVENTION

The present invention has been made in consideration of the above problems, and has as its object to implement an image reproducing technique which preferentially reproduces images having a specific directory structure and also can reproduce images nonconforming to the specific directory structure.

In order to achieve the above object, according to the present invention, there is provided an image reproducing apparatus which reproduces image files stored in a recording medium, comprising: a retrieving unit adapted to separately retrieve for a first image group recorded in accordance with a first file rule and a second image group nonconforming to the first file rule; a determination unit adapted to determine a reproducing order for an image group which has been completely retrieved by the retrieving unit upon discriminating the first image group and the second image group; and a reproducing unit adapted to reproduce an image group for which the reproducing order is determined, wherein the retrieving unit starts retrieving for the second image group when finishing retrieving for the first image group, and the reproducing unit reproduces an image group, which has completely been retrieved by the retrieving unit, in a reproducing order determined by the determination unit.

There is also provided a method of controlling an image reproducing apparatus which reproduces image files stored in a recording medium, comprising: a retrieving step of separately retrieving for a first image group recorded in accordance with a first file rule and a second image group nonconforming to the first file rule; a determination step of determining a reproducing order for an image group which has been completely retrieved in the retrieving step upon discriminating the first image group and the second image group; and a step of reproducing an image group for which the reproducing order is determined, wherein in the retrieving step, retrieving for the second image group starts when finishing retrieving for the first image group, and in the reproducing step, an image group, which has completely been retrieved, is reproduced in a determined reproducing order.

According to the present invention, this technique can preferentially reproduce images having a specific directory structure and also can reproduce images nonconforming to the specific directory structure.

Further features of the present invention will become apparent from the following description of exemplary embodiments (with reference to the attached drawings).

DESCRIPTION OF THE EMBODIMENTS

The best mode for carrying out the present invention will be described in detail below with reference to the accompanying drawings.

Note that an embodiment to be described below is merely an example of implementing the present invention, and can be modified or changed, as needed, depending on the arrangement of an apparatus to which the present invention is applied and various conditions. The present invention is not limited to the following embodiments.

[Explanation of Apparatus]

Figure 1:
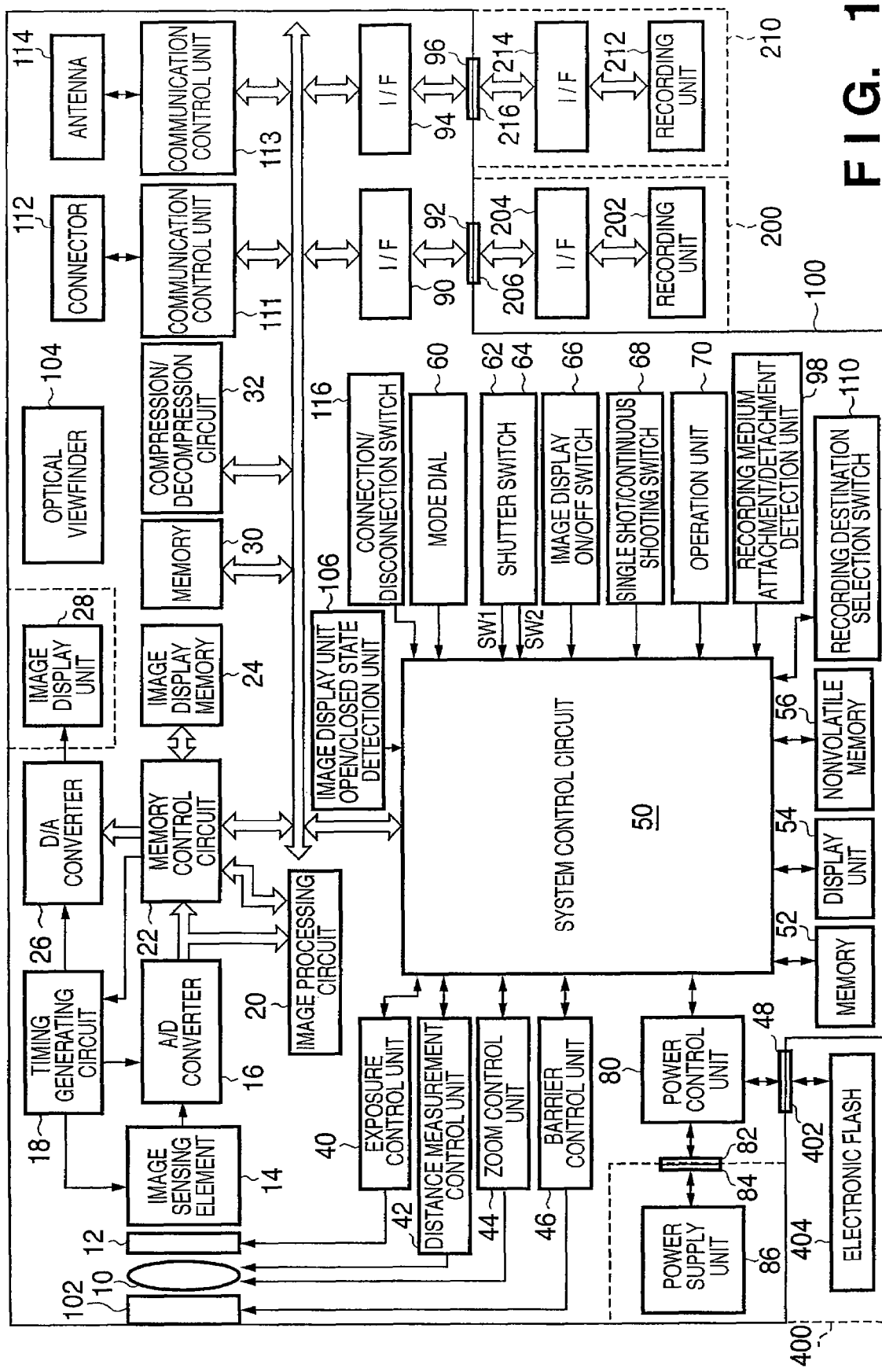
FIG. 1 is a block diagram showing an image processing apparatus according to an embodiment of the present invention.

FIG. 1 is a block diagram showing the arrangement of an image processing apparatus according to an embodiment of the present invention.

Referring to FIG. 1, reference numeral 100 denotes an image processing apparatus typified by an electronic camera or the like.

Reference numeral 10 denotes a lens; 12, a shutter having a stop function; 14, an image sensing element which converts an optical image into an electrical signal; and 16, an A/D converter which converts an analog signal output from the image sensing element 14 into a digital signal.

Reference numeral 18 denotes a timing generating circuit which supplies clock signal and control signals to the A/D converter 16 and a D/A converter 26. A memory control circuit 22 and a system control circuit 50 control the timing generating circuit 18.

Reference numeral 20 denotes an image processing circuit which performs predetermined pixel interpolation processing and color conversion processing for data from the A/D converter 16 or data from the memory control circuit 22.

The image processing circuit 20 also performs a predetermined arithmetic processing by using obtained image data. The system control circuit 50 controls an exposure control unit 40 and a distance measurement control unit 42 based on the arithmetic processing result obtained by the image processing circuit 20, thus performing AF (Auto Focus) processing, AE (Auto Exposure) processing, and EF (Electronic flash pre-emission) processing of the TTL (Through The Lens) system.

In addition, the image processing circuit 20 performs a predetermined arithmetic processing by using obtained image data, and performs AWB (Auto White Balance) processing of the TTL system based on the obtained arithmetic processing result.

The memory control circuit 22 controls the A/D converter 16, the timing generating circuit 18, the image processing circuit 20, an image display memory 24, the D/A converter 26, a memory 30, and a compression/decompression circuit 32.

Data from the A/D converter 16 is written in the image display memory 24 or the memory 30 through the image processing circuit 20 and the memory control circuit 22 or is written in the image display memory 24 or the memory 30 through the memory control circuit 22.

Reference numeral 28 denotes an image display unit comprising a TFT LCD and the like. The image display unit 28 displays display image data written in the image display memory 24 through the D/A converter 26.

Sequentially displaying obtained image data on the image display unit 28 makes it possible to implement an electronic viewfinder (EVF) function.

The image display unit 28 can turn the display on/off in accordance with an instruction from the system control circuit 50. Turning off the display can greatly reduce the power consumption of the image processing apparatus 100.

The image display unit 28 is coupled to the main body of the image processing apparatus 100 via a rotatable hinge. The image display unit 28 can be set in a free direction at a free angle, and allows a user to use an electronic viewfinder function, reproduction display function, and various display functions.

The display of the image display unit 28 can be stored by directing it toward the image processing apparatus 100. In this case, an image display unit open/closed state detection unit 106 detects the storage state to stop display operation of the image display unit 28.

The memory 30 stores pickup still and moving images, and has a storage capacity large enough to store a predetermined number of still images or a predetermined time period of moving images.

For this reason, in the case of continuous shooting to continuously pick up a plurality of still images, or in the case of panoramic shooting, it is possible to perform image writing into the memory 30 at high speed and in large volume.

Furthermore, it is possible to use the memory 30 as a work area of the system control circuit 50.

The compression/decompression circuit 32 compresses/decompresses image data by adaptive discrete cosine transform (ADCT) or the like. The compression/decompression circuit 32 receives image data stored in the memory 30, performs compression processing or decompression processing in accordance with the JPEG or MPEG format, and writes the processed data in the memory 30.

The exposure control unit 40 controls the shutter 12 having the stop function and also has an electronic flash brightness control function in conjunction with an electronic flash 404.

The distance measurement control unit 42 controls focusing of the lens 10. A zoom control unit 44 controls zooming of the lens 10. A barrier control unit 46 controls the operation of a barrier 102.

The exposure control unit 40 and the distance measurement control unit 42 are controlled by the TTL system. The system control circuit 50 controls the exposure control unit 40 and the distance measurement control unit 42 based on the result obtained by arithmetic processing of obtained image data using the image processing circuit 20.

Reference numeral 48 denotes a connector which is also called an accessory shoe and comprises an electrical contact and mechanical fixing device for an electronic flash device 400.

The system control circuit 50 controls the entire image processing apparatus 100. Reference numeral 52 denotes a memory which stores constants, variables, programs, and the like for the operation of the system control circuit 50.

Reference numeral 54 denotes a display unit which comprises a liquid crystal display, a speaker, and the like, and displays an operation state, a message, and the like using characters, images, sounds, and the like in accordance with the execution of a program by the system control circuit 50. The image processing apparatus 100 has one or a plurality of display units 54 arranged at easily observable positions near the operation unit. The display unit 54 comprises a combination of an LCD, an LED, a sound producing element, and the like.

Part of the function of the display unit 54 is set in an optical viewfinder 104.

Of the display contents of the display unit 54, those displayed on the LCD or the like include a single shot/continuous shooting mode indication, a self-timer indication, a compression ratio indication, an indication of the number of recording pixels, an indication of the number of recorded images, an indication of the number of remaining images that can be picked up, and the like. Other display contents include a shutter speed indication, an F-number indication, an exposure correction indication, an electronic flash indication, a red-eye reduction indication, a macro shooting indication, a buzzer setting indication, a remaining timepiece battery level indication, a remaining battery level indication, an error indication, an information indication by a number composed of a plurality of digits, and the like. Such display contents further include an indication of the attachment/detachment state of a recording media 200 and 210, a communication I/F operation indication, a date/time indication, and the like.

Of the display contents of the display unit 54, those displayed in the optical viewfinder 104 include an in-focus indication, camera shake warning indication, electronic flash charge indication, shutter speed indication, F-number indication, exposure correction indication, and the like.

Reference numeral 56 denotes a nonvolatile memory that is electrically erasable/recordable. This apparatus uses an EEPROM or the like as the nonvolatile memory 56.

Reference numerals 60, 62, 64, 66, 68, and 70 denote operation devices for inputting various operation instructions to the system control circuit 50. Each of these devices comprises a switch, a dial, a touch panel, a pointing device by line-of-sight detection, a voice recognition device, or the like or a combination thereof.

These operation devices will be concretely described below.

The mode dial switch 60 allows switching/setting of the following function modes including a power OFF mode, automatic shooting mode, manual shooting mode, panoramic shooting mode, reproduction mode, multi-screen reproducing/erase mode, PC connection mode, and the like.

The shutter switch SW1 62 is turned ON by pressing a shutter button (not shown) halfway and instructs the start of various operations, such as AF (Auto-Focus) processing, AE (Auto-Exposure) processing, AWB (Auto-White-Balance) processing, and EF (Electronic Flash Pre-Emission) processing.

Pressing the shutter button (not shown) fully turns on the shutter switch SW2 64. This operation issues an instruction to start exposure processing of writing a signal read from the image sensing element 14, as image data, in the memory 30 through the A/D converter 16 and the memory control circuit 22. In addition, the shutter switch SW2 64 issues an instruction to start developing process using arithmetic processing in the image processing circuit 20 and the memory control circuit 22. The shutter switch SW2 64 further issues an instruction to start recording processing of reading image data from the memory 30, compressing the data in the compression/decompression circuit 32, and writing the image data in the recording medium 200 or 210.

Using the image display ON/OFF switch 66 makes it possible to set the ON/OFF state of the image display unit 28. Power can be saved by shutting off the supply of power to the image display unit 28 comprising a TFT LCD and the like by using this function when capturing an image by using the optical viewfinder 104.

The single shot/continuous shooting switch 68 can set a single shot mode in which a standby state is set after one frame is picked up when the shutter switch SW2 is pressed, and a continuous shooting mode in which shooting is continuously performed while the shutter switch SW2 is kept pressed.

Reference numeral 110 denotes a recording destination selection switch which can select the recording destination of a pickup image from "external storage device", "recording medium", and "external storage device and recording medium".

Reference numeral 116 denotes a connection/disconnection switch which can issue an instruction to connect/disconnect to/from the external device.

The operation unit 70 comprises various buttons, a touch panel, and the like. More specifically, the operation unit 70 includes a menu button, set button, macro button, multi-screen reproducing/new page button, electronic flash setting button, single shot/continuous shooting/self-timer switching button, and the like. The operation unit 70 also includes a menu movement+ (plus) button, menu movement−(minus) button, reproducing image movement+(plus) button, reproducing image movement− (minus) button, pickup image quality selection button, exposure correction button, date/time setting button, and the like.

The operation unit 70 also includes a selection/switching button for selecting various functions in executing image pickup in a panoramic mode or the like and reproduction, and a determination/execution button for determining and executing various functions in executing image pickup and reproduction in the panoramic mode or the like.

The operation unit 70 also includes an image display ON/OFF switch for turning the image display unit 28 on/off, and a quick review ON/OFF switch for executing a quick review function of automatically reproducing obtained image data immediately after image pickup. The operation unit 70 also includes a compression mode switch for selecting a compression ratio in JPEG compression or selecting a CCDRAW mode of digitalizing a signal from the image sensing element and recording it on a recording medium. The operation unit 70 also includes a reproduction mode switch which can set various function modes such as the reproduction mode, multi-screen reproduction/erase mode, and PC connection mode. The operation unit 70 also includes a reproduction switch which gives the instruction to start a reproduction operation by which an image picked up in a pickup mode is read out from the memory 30 or the recording medium 200 or 210 and displayed on the image display unit 28.

Reference numeral 80 denotes a power control unit which comprises a power supply detection circuit, a DC/DC converter, a switch circuit which switches blocks to be energized, and the like. The power control unit 80 detects the attachment/detachment of a battery, the type of battery, and the remaining battery level, and controls the DC/DC converter based on the detection result and an instruction from the system control circuit 50, thereby applying a necessary voltage to each unit including a recording medium for a necessary period of time.

Reference numerals 82 and 84 denote connectors; and 86, a power supply unit which comprises a primary battery such as an alkaline battery or a lithium battery, a secondary battery such as an NiCd battery, an NiMH battery, or an Li battery, an AC adaptor, and the like.

Reference numerals 90 and 94 denotes interfaces for recording media such as a memory card and a hard disk. Reference numerals 92 and 96 denote connectors for connection to recording media such as a memory card and a hard disk. Reference numeral 98 denotes a recording medium attachment/detachment detection unit which detects whether the recording medium 200 or 210 connects to the connector 92 or 96.

Although this embodiment has exemplified the apparatus including two systems of interfaces and connectors for the attachment of recording media, the apparatus may comprise either a single system or a plurality of systems of interfaces and connectors for the attachment of recording media. In addition, the apparatus may comprise a combination of interfaces and connectors with different standards.

The apparatus can use, as interfaces 90 and 94 and connectors 92 and 96, those complying with standards such as the PCMCIA card standard and the CF (CompactFlash (registered trademark)) card standard. In this case, various types of communication cards such as a LAN card, a modem card, a USB card, an IEEE1394 card, a P1284 card, a SCSI card, and a communication card for PHS connect to the interfaces 90 and 94 and connectors 92 and 96. This makes it possible to transfer image data and management information attached to image data to/from other computers and peripheral devices such as printers.

The barrier 102 serves as a protection device which covers an image sensing unit including the lens 10 of the image processing apparatus 100 to prevent the image sensing unit from being contaminated and damaged.

Using only the optical viewfinder 104 makes it possible to perform image pickup without using the electronic viewfinder function of the image display unit 28. In addition, information associated with some of the functions displayed on the display unit 54 and displayed in the optical viewfinder 104 includes an in-focus indication, camera shake warning indication, electronic flash charge indication, shutter speed indication, F-number indication, exposure correction indication, and the like.

The image display unit open/closed state detection unit 106 can detect whether the display of the image display unit 28 is stored by directing it toward the image processing apparatus 100. In this case, upon detecting that the image display unit 28 is stored, the image display unit open/closed state detection unit 106 stops the display operation of the image display unit 28 to inhibit unnecessary power consumption.

Reference numerals 111 and 113 denote communication control units which include various communication functions such as RS232C, USB, IEEE1394, P1284, SCSI, modem, LAN, and wireless communication.

Reference numeral 112 denotes a wired connector such as a USB connector or an IEEE1394 connector which connects the image processing apparatus 100 to another device by using the communication control unit 111.

Reference numeral 114 denotes an antenna for wireless connection implemented by wireless LAN communication such as IEEE802.11b/g, spread-spectrum communication such as Bluetooth, infrared communication such as IrDA, or the like.

This embodiment exemplifies the system arrangement having both the wired connector 112 and wireless antenna 114. However, no problem occurs even when the system arrangement has only one of these.

As described above, various types of communication cards such as a LAN card, a modem card, a USB card, an IEEE1394 card, a P1284 card, a SCSI card, and a communication card for PHS may connect to the interfaces 90 and 94 and connectors 92 and 96 to communicate with the external device.

The recording medium 200 is a memory card, a hard disk, or the like.

The recording medium 200 comprises a recording unit 202 comprising a semiconductor memory, a magnetic disk, or the like, an interface 204 for the image processing apparatus 100, and a connector 206 for connection to the image processing apparatus 100.

The recording medium 210 is a memory card, a hard disk, or the like.

The recording medium 210 comprises a recording unit 212 comprising a semiconductor memory, a magnetic disk, or the like, an interface 214 for the image processing apparatus 100, and a connector 216 for connecting to the image processing apparatus 100.

Reference numeral 402 denotes a connector for connecting the accessory shoe of the image processing apparatus 100.

The electronic flash 404 has an AF auxiliary light projection function and electronic flash brightness control function.

[Explanation of Operation]

The image pickup operation of the image sensing apparatus 100 of this embodiment will be described next with reference to FIGS. 2A to 15.

FIGS. 2A to 4B are flowcharts showing main routines for the image sensing apparatus 100 of this embodiment.

Figure 2A:
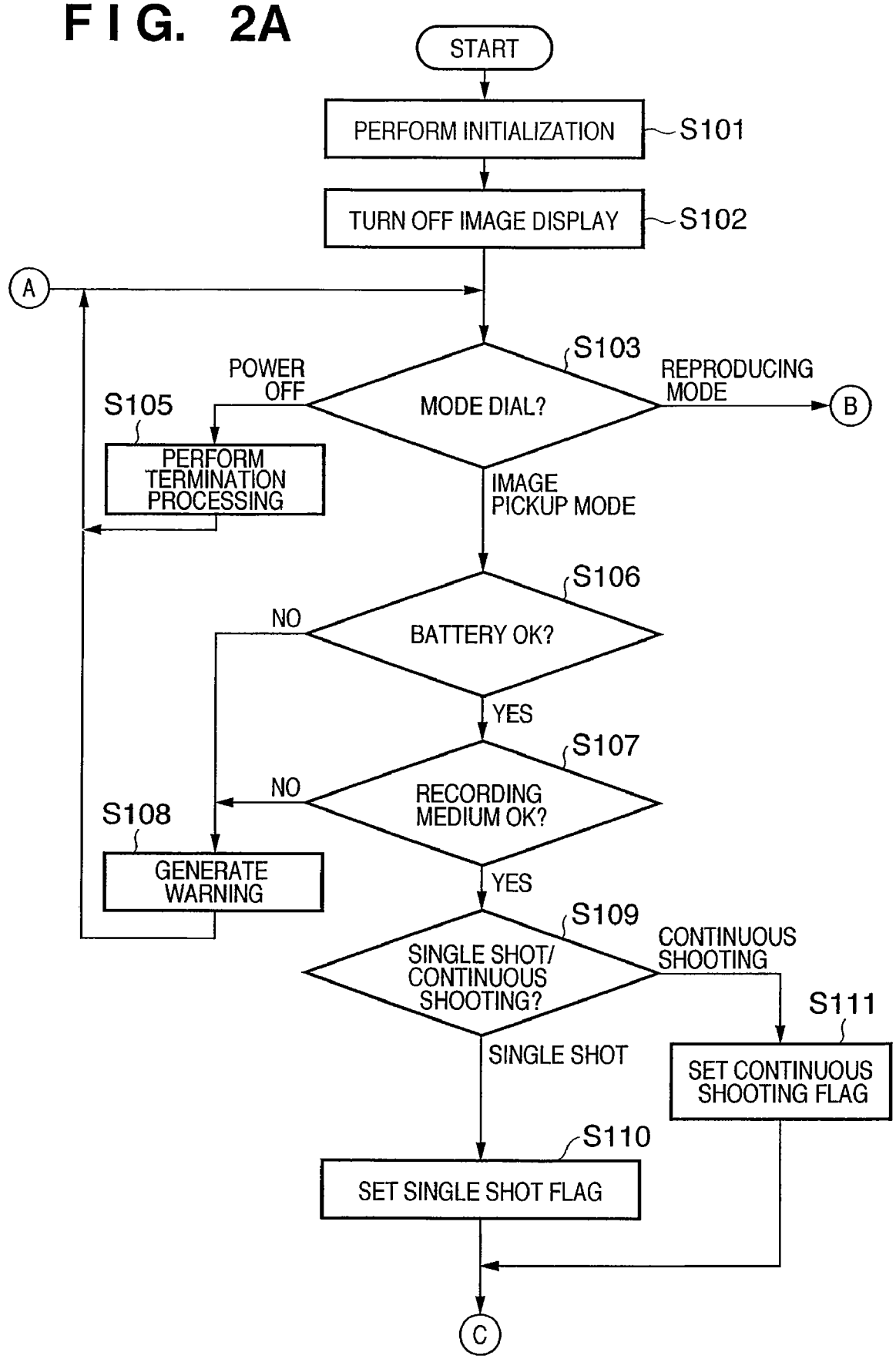
FIGS. 2A and 2B are flowcharts showing a main routine for the image processing apparatus according to the embodiment of the present invention.
Figure 2B:
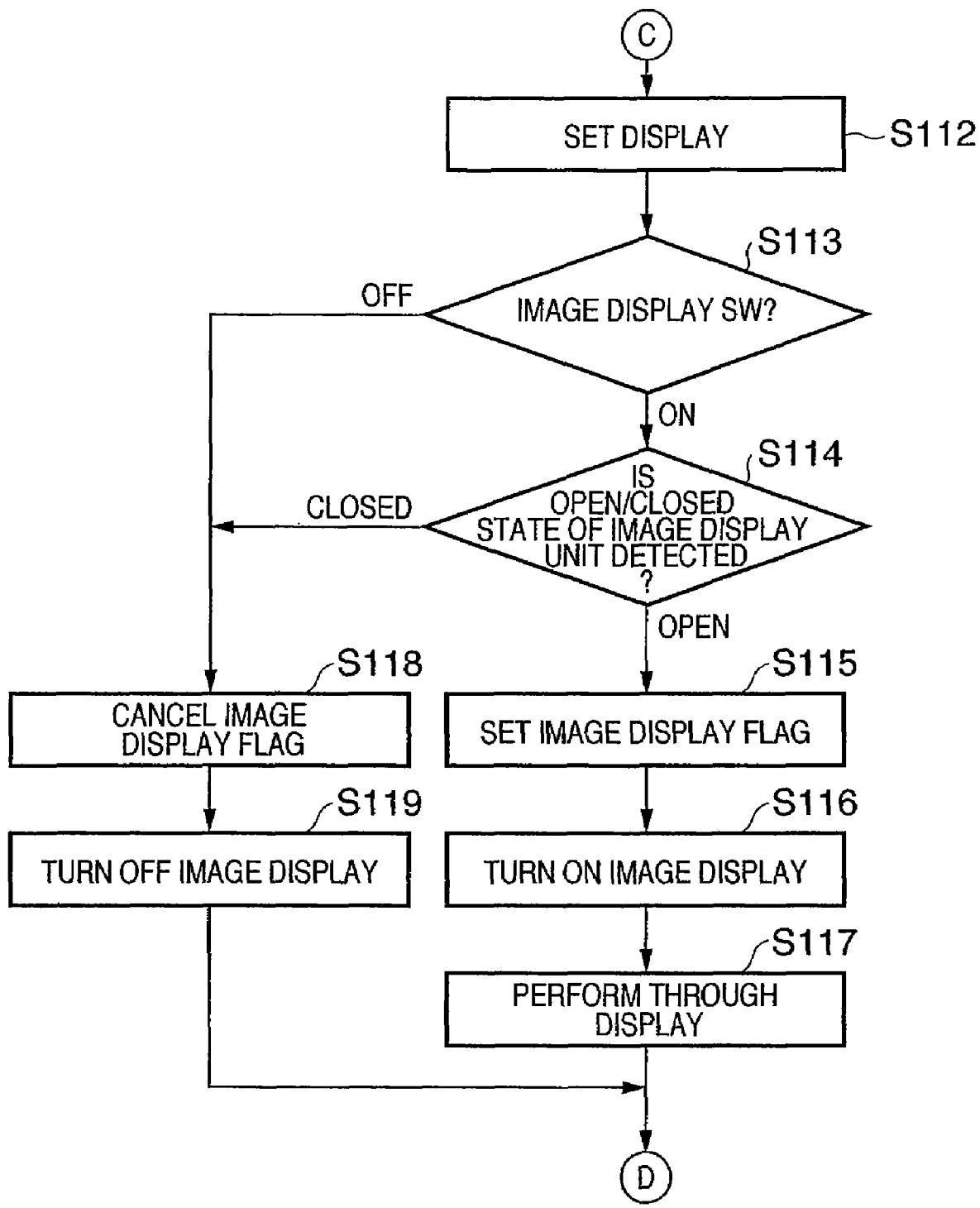

Referring to FIGS. 2A and 2B, when the user turns on the power supply after changing the battery, the system control circuit 50 initializes flags, control variables, and the like (S101), and initializes the image display of the image display unit 28 to the OFF state (S102)

The system control circuit 50 determines the set position of the mode dial 60. If the mode dial 60 is set to the power OFF position (S103), the system control circuit 50 changes the display of each of the image display units 28 and 54 to the terminated state, and closes the barrier 102 to protect the image sensing unit. The system control circuit 50 further records flags, necessary parameters including control variables and the like, set values, and set modes on the nonvolatile memory 56. After the power control unit 80 performs predetermined termination processing, e.g., interrupting unnecessary power to the respective components of the apparatus which include the image display unit 28 (S105), the process returns to step S103.

Figure 9A:
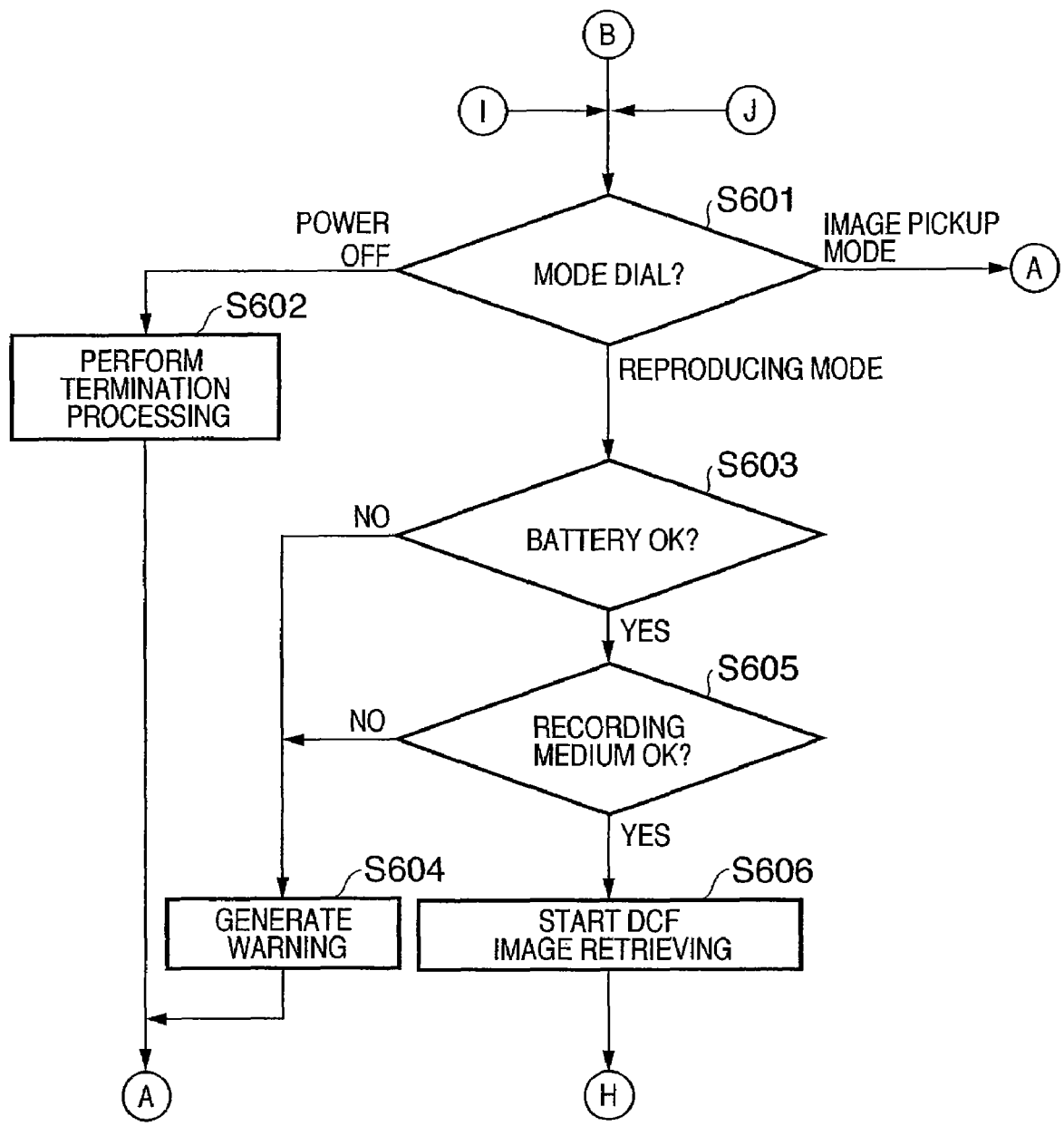
FIGS. 9A and 9B are flowcharts showing the main routine for the image processing apparatus according to the embodiment of the present invention.

If the mode dial 60 is set to the reproducing mode (S103), the process advances to step S601 in FIG. 9A.

If the mode dial 60 is set to the image pickup mode (S103), the process advances to step S106.

The system control circuit 50 determines, by using the power control unit 80, whether the remaining capacity or operation state of the power supply unit 86 comprising a battery and the like poses a problem in terms of the operation of the image processing apparatus 100 (S106). If there is a problem, the system control circuit 50 displays a predetermined warning with an image or sound by using the display unit 54 (S108). The process then returns to step S103.

If there is no problem in the power supply unit 86 (S106), the system control circuit 50 determines whether the operation state of the recording medium 200 or 210 poses a problem in the operation of the image processing apparatus 100, more specifically, image data recording/reproducing operation with respect to a recording medium (S107). If there is a problem, the system control circuit 50 displays a predetermined warning with an image or sound by using the display unit 54 (S108). The process then returns to step S103.

If there is no problem in the operation state of the recording medium 200 or 210 (S107), the process advances to step S109.

The system control circuit 50 determines the set state of the single shot/continuous shooting switch 68 which sets the single shot/continuous shooting mode (S109). If the single shot mode is selected, the system control circuit 50 sets the single shot/continuous shooting flag to "single shot" (S110). If the continuous shooting mode is selected, the system control circuit 50 sets the single shot/continuous shooting flag to "continuous shooting" (S111). When the system control circuit 50 completes flag setting, the process advances to step S112 of FIG. 2B.

The single shot/continuous shooting switch 68 allows for switching between the single shot mode of picking up one frame and setting a standby state when the user presses the shutter switch SW2 and the continuous shooting mode of continuously picking up images while the user presses the shutter switch SW2.

Note that the system control circuit 50 stores the state of the single shot/continuous shooting flag in the internal memory or the memory 52.

The system control circuit 50 displays various set states of the image processing apparatus 100 with images or sounds by using the display unit 54 (S112). If the image display of the image display unit 28 is ON, the system control circuit 50 displays various states of the image processing apparatus 100 with images or sounds using the image display unit 28.

Subsequently, the system control circuit 50 determines the set state of the image display ON/OFF switch 66 (S113). If the switch is set to the image display ON position, the process advances to step S114.

Furthermore, the system control circuit 50 determines, by using the image display unit open/closed state detection unit 106, whether the image display unit 28 is in the housed state or the display state (S114). If it is determined that the image display unit 28 is in the display state, the system control circuit 50 sets the image display flag (S115), and sets the image display of the image display unit 28 to the ON state (S116). The system control circuit 50 also sets the image display unit 28 to a through display state wherein obtained image data are sequentially displayed (S117). The process then advances to step S131 in FIG. 3.

In the through display state, the image display unit 28 sequentially displays, through the memory control circuit 22 and the D/A converter 26, the data sequentially written in the image display memory 24 through the image sensing element 14, A/D converter 16, image processing circuit 20, and memory control circuit 22. This implements an electronic viewfinder function.

If the image display ON/OFF switch 66 is set at the image display OFF position (S113) or the image display unit 28 is set in the housed state (S114), the system control circuit 50 cancels the image display flag (S118), and sets the image display of the image display unit 28 to the OFF state (S119). The process then advances to step S131 of FIG. 3.

If the image display is OFF, the user operates image pickup by using the optical viewfinder 104 without using the electronic viewfinder function provided by the image display unit 28. This operation can reduce the power consumption of the image display unit 28, D/A converter 26, and the like which consume a large amount of power. Note that the system control circuit 50 stores the state of the image display flag in the internal memory or the memory 52.

Figure 3:
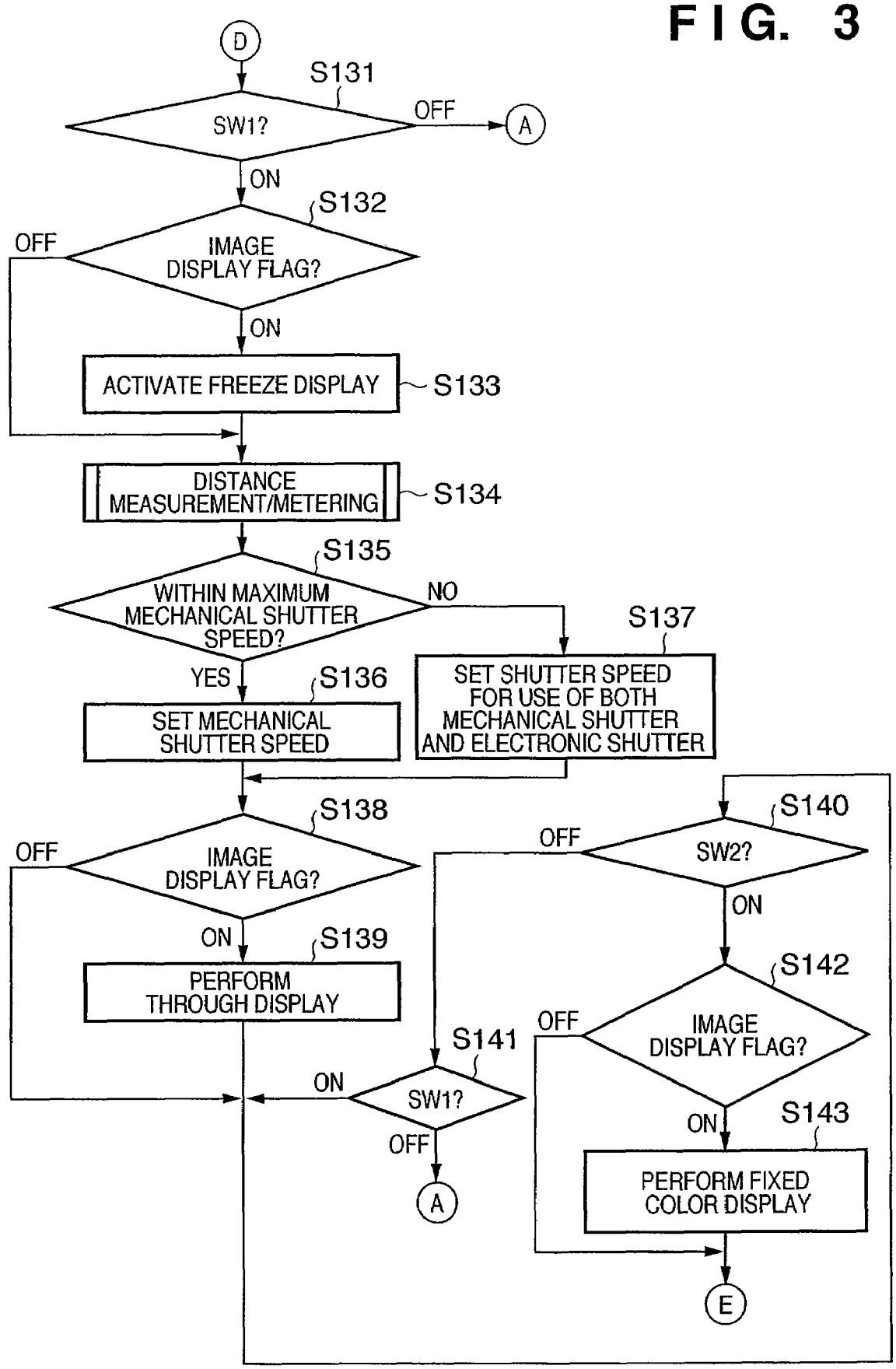
FIG. 3 is a flowchart showing the main routine for the image processing apparatus according to the embodiment of the present invention.

Referring to FIG. 3, if the user does not press the shutter switch SW1 (S131), the process returns to step S103 of FIG. 2A.

If the user presses the shutter switch SW1 (S131), the system control circuit 50 determines the state of the image display flag stored in the internal memory of the system control circuit 50 or the memory 52 (S132). If the image display flag is set, the system control circuit 50 sets the display state of the image display unit 28 to the freeze display state (S133). The process then advances to step S134.

In the freeze display state, the system control circuit 50 inhibits image data from being rewritten in the image display memory 24 through the image sensing element 14, A/D converter 16, image processing circuit 20, and memory control circuit 22. In addition, the system control circuit 50 displays the frozen picture on the electronic viewfinder by displaying the finally written image data on the image display unit 28 through the memory control circuit 22 and the D/A converter 26.

If the image display flag is canceled (S132), the process advances to step S134.

The system control circuit 50 performs a distance measurement process to focus the lens 10 on an object, and performs a metering process to determine an F-number and a shutter time (S134). In the metering process, the system control circuit 50 makes electronic flash setting, as needed. This distance measurement/metering process in step S134 will be described in detail later with reference to FIG. 5.

Upon completing the distance measurement/metering process, the system control circuit 50 determines, from the exposure result determined in the set image pickup mode and the distance measurement/metering process, whether the shutter speed to be set exceeds the maximum shutter speed of the mechanical shutter (S135). If YES, the system control circuit 50 sets the shutter speed of the mechanical shutter (S136). The process then advances to step S138. If NO, the system control circuit 50 sets a shutter speed for the use of both the mechanical shutter and the electronic shutter (S137). The process then advances to step S138.

The system control circuit 50 determines the state of the image display flag stored in the internal memory or the memory 52 (S138). If the image display flag is set, the system control circuit 50 sets the display state of the image display unit 28 to the through display state (S139). The process then advances to step S140.

As described above, if the shutter speed to be set exceeds the maximum shutter speed of the mechanical shutter, the system control circuit 50 also uses the electronic shutter. This makes it possible to prevent the occurrence of smear by the mechanical shutter and set a high shutter speed using the electronic shutter.

If the user does not press the shutter switch SW2 (S140) and releases the shutter switch SW1 (S141), the process returns to step S103 of FIG. 2A.

If the user presses the shutter switch SW2 (S140), the system control circuit 50 determines the state of the image display flag stored in the internal memory or the memory 52 (S142). If the image display flag is set, the system control circuit 50 sets the display state of the image display unit 28 to the fixed color display state (S143). The process then advances to step S161 of FIG. 4A.

In the fixed color display state, the system control circuit 50 displays, on the image display unit 28, the fixed color image data replacing the obtained image data written in the image display memory 24 through the image sensing element 14, A/D converter 16, image processing circuit 20, and memory control circuit 22. In this manner, the system control circuit 50 displays a fixed color picture on the electronic viewfinder.

Figure 4A:
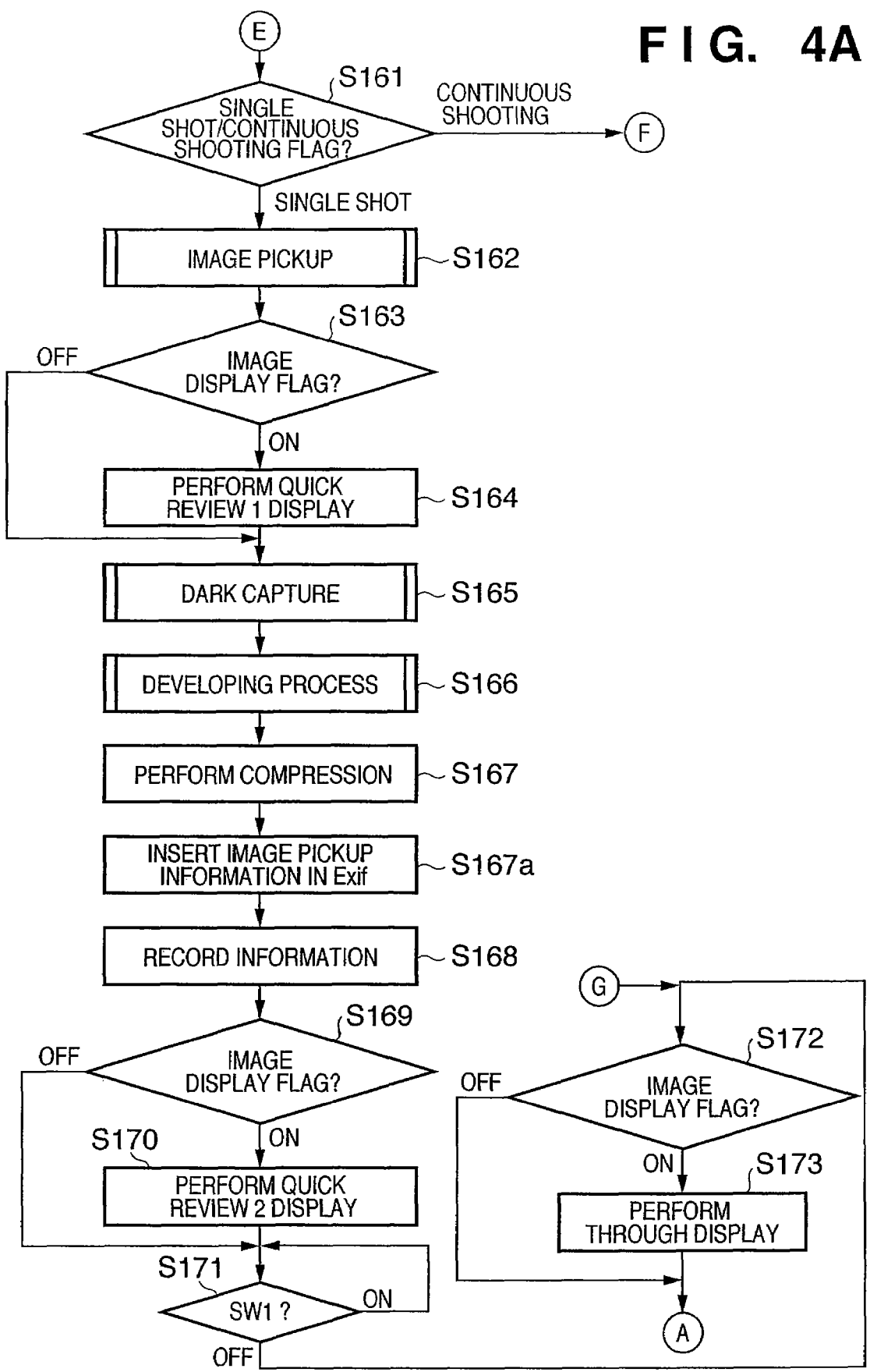
FIGS. 4A and 4B are flowcharts showing the main routine for the image processing apparatus according to the embodiment of the present invention.

If the image display flag is canceled (S142), the process advances to step S161 of FIG. 4A.

Referring to FIG. 4A, the system control circuit 50 determines the state of the single shot/continuous shooting flag stored in the internal memory or the memory 52 (S161). If the single shot flag is set, the process advances to step S162. If the continuous shooting flag is set, the process advances to step S181 of FIG. 4B.

The system control circuit 50 executes an image pickup process comprising an exposure process and a developing process (S162). In the exposure process, the system control circuit 50 writes obtained image data in the memory 30 through the image sensing element 14, A/D converter 16, image processing circuit 20, and memory control circuit 22, or writes it directly from the A/D converter 16 into the memory 30 through the memory control circuit 22. In the developing process, the system control circuit 50 reads out image data written in the memory 30 by using the memory control circuit 22 or using the image processing circuit 20 as needed, and performs various kinds of processes (S162).

The image pickup process in step S162 will be described in detail with reference to FIG. 6.

The system control circuit 50 determines the state of the image display flag stored in the internal memory or the memory 52 (S163). If the image display flag is set, the system control circuit 50 performs quick review 1 display (S164). In the quick review 1 display, the system control circuit 50 reads out image data processed in accordance with the display form of the image display unit 28 from the memory 30, and transfers the display image data to the image display memory 24 through the memory control circuit 22. In addition, the system control circuit 50 displays the display image data read out from the image display memory 24 on the image display unit 28.

In this quick review 1 display process, since a dark capture process (S165) has not been performed, the system control circuit 50 generates display image data by using image data before dark correction computation, and performs quick review display.

As described above, in the single shot mode, the system control circuit 50 performs an image pickup process before a dark capture process, and uses image data before dark correction for quick review display. This makes it possible to shorten the shutter release time lag and perform quick review display immediately after image pickup.

In the quick review 1 display (S164), since the dark capture process (S165) has not been complete, the system control circuit 50 superimposes and displays a character such as "busy" or the like on the quick review image display on the image display unit 28.

If the image display flag is canceled (S163), the process advances to step S165 while the image display unit 28 remains in the OFF state. In this case, the image display unit 28 remains off after image pickup, and the system control circuit 50 does not perform quick review display. This is a using method which need not check pickup image immediately after image pickup and places importance on power saving without using the electronic viewfinder of the image display unit 28 as in the case wherein the system control circuit 50 keeps image pickup using the optical viewfinder 104.

The system control circuit 50 performs a dark capture process of accumulating noise components such as dark currents in the image sensing element 14 while the shutter 12 is closed for the same period of time as that in actual image pickup, and reading out a noise image signal upon completion of accumulation (Si65). The process then advances to step S166.

Performing a correction computation process by using the dark image data captured in this dark capture process makes it possible to correct the image quality deterioration of the obtained image data, e.g., pixel omission due to dark current noise produced in the image sensing element 14 or a flaw unique to the image sensing element 14.

The details of this dark capture process in step S165 will be described below with reference to FIG. 7.

The system control circuit 50 reads out part of the image data written in a predetermined area of the memory 30 through the memory control circuit 22, and performs a WB (White Balance) integral computation process and OB (Optical Black) integral computation process required to execute a developing process. The system control circuit 50 also stores the computation results in the internal memory or the memory 52.

The system control circuit 50 reads out obtained image data written in the predetermined area of the memory 30 using the memory control circuit 22 and also using the image processing circuit 20 as needed. The system control circuit 50 also performs various developing processes including AWB (Auto White Balance) process, gamma conversion, color conversion, and the like using the computation results stored in the internal memory or the memory 52 (S166).

In the developing process, the system control circuit 50 also performs a dark correction computation process for canceling dark current noise and the like of the image sensing element 14 by executing a subtraction process using the dark image data obtained in the dark capture process.

This developing process in step S166 will be described in detail later with reference to FIG. 8.

The system control circuit 50 reads out image data written in the predetermined area of the memory 30, and makes the compression/decompression circuit 32 perform an image compression process in accordance with the set mode (S167).

The system control circuit 50 records image pickup information such as an image picking up date, the Mode 1 ID of the camera, and a color effect mode at the time of image pickup in an Exif header (S167a), and writes the image data having undergone a series of processes upon image pickup in a free image space of the image storage buffer area on the memory 30.

The system control circuit 50 performs a recording process of reading out the image data stored in the image storage buffer area of the memory 30, and writing the data in the recording medium 200 or 210 such as a memory card through the interfaces 90 and 94 and the connectors 92 and 96 (S168).

While writing image data in the recording medium 200 or 210, the system control circuit 50 displays a recording medium write access indication, e.g., blinking an LED, on the display unit 54, to clearly indicate that write access is being performed.

The system control circuit 50 determines the state of the image display flag stored in the internal memory or the memory 52 (S169). If the image display flag is set, the system control circuit 50 performs quick review 2 display (S170). In quick review 2 display, the system control circuit 50 reads out image data processed in accordance with the display form of the image display unit 28 from the memory 30, and transfers the display image data to the image display memory 24 through the memory control circuit 22. The system control circuit 50 further displays the display image data read out from the image display memory 24 on the image display unit 28.

In the quick review 2 display process, since a dark capture process (S165) has already been executed, the system control circuit 50 generates display image data by using the image data having undergone dark correction computation in a developing process (S166) and performs quick review display.

In the single shot mode, the system control circuit 50 performs an image pickup process first by a dark capture process, and then performs quick receive 1 display by using image data before dark correction. Performing quick review 2 display by using image data having undergone dark correction after performing a dark capture process makes it possible to shorten the shutter release time lag and perform quick review display immediately after image pickup.

In quick review 2 display (S170), since a dark capture process (S165) has already been performed, the system control circuit 50 erases a character indication such as "busy" superimposed and displayed on the quick review image display on the image display unit 28 in the quick review 1 display (S164).

If the image display flag is canceled (S169), the process advances to step S171 without changing the OFF state of the image display unit 28. In this case, the system control circuit 50 keeps the OFF state of the image display unit 28 even after image pickup, and does not perform quick review display. This is a using method which need not check a pickup image immediately after image pickup and places importance on power saving without using the electronic viewfinder of the image display unit 28 as in the case wherein the user keeps image pickup operation by using the optical viewfinder 104.

The system control circuit 50 repeats the current process until the user releases the shutter switch SW1 (S171)

If the user releases the shutter switch SW1 (S171), the process advances to step S172.

Figure 4B:
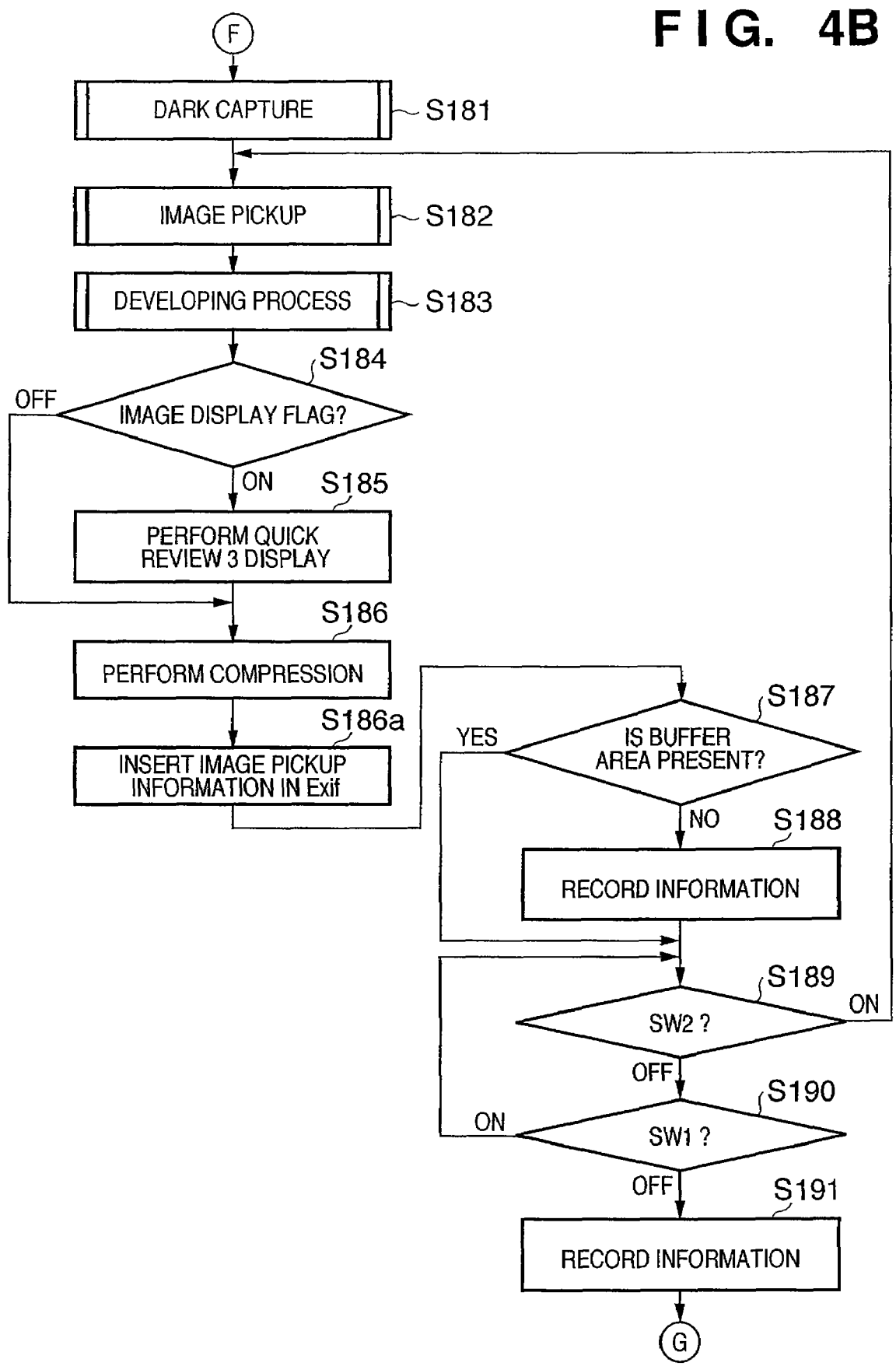

If the system control circuit 50 determines the state of the single shot/continuous shooting flag and determines that the continuous shooting flag is set in step S161, the process advances to step S181 of FIG. 4B.

The system control circuit 50 performs a dark capture process of accumulating noise components such as dark currents in the image sensing element 14 while the shutter 12 is closed for the same period of time as that in actual image pickup, and reading out a noise image signal upon completion of accumulation (S181). The process then advances to step S182.

Performing a correction computation process by using the dark image data captured in this dark capture process makes it possible to correct the image quality deterioration of the obtained image data, e.g., pixel omission due to dark current noise produced in the image sensing element 14 or a flaw unique to the image sensing element 14.

The details of this dark capture process in step S181 will be described below with reference to FIG. 7.

The system control circuit 50 executes an image pickup process comprising an exposure process and a developing process (S182). In the exposure process, the system control circuit 50 writes obtained image data in the memory 30 through the image sensing element 14, A/D converter 16, image processing circuit 20, and memory control circuit 22, or writes it directly from the A/D converter 16 into the memory 30 through the memory control circuit 22. In the developing process, the system control circuit 50 reads out image data written in the memory 30 by using the memory control circuit 22 or using the image processing circuit 20 as needed, and performs various kinds of processes (S182).

This image pickup process in step S182 will be described in detail later with reference to FIG. 6.

The system control circuit 50 reads out part of the image data written in the predetermined area of the memory 30 through the memory control circuit 22, and performs a WB (White Balance) integral computation process and OB (Optical Black) integral computation process required to execute a developing process. The system control circuit 50 also stores the computation results in the internal memory or the memory 52.

The system control circuit 50 reads out obtained image data written in the predetermined area of the memory 30 using the memory control circuit 22 and also using the image processing circuit 20 as needed. The system control circuit 50 also performs various developing processes including AWB (Auto White Balance) process, gamma conversion, color conversion, and the like using the computation results stored in the internal memory or the memory 52 (S183).

In the developing process, the system control circuit 50 also performs a dark correction computation process for canceling dark current noise and the like of the image sensing element 14 by executing a subtraction process using the dark image data captured in the dark capture process.

This developing process in step S183 will be described in detail later with reference to FIG. 8.

The system control circuit 50 determines the state of the image display flag stored in the internal memory or the memory 52 (S184). If the image display flag is set, the system control circuit 50 performs quick review 3 display (S185).

In the quick review 3 display, the system control circuit 50 reads out image data processed in accordance with the display form of the image display unit 28 from the memory 30, and transfers the display image data to the image display memory 24 through the memory control circuit 22. In addition, the system control circuit 50 displays the display image data read out from the image display memory 24 on the image display unit 28.

In this quick review 3 display process, since a dark capture process (S181) has already been performed, the system control circuit 50 generates display image data by using the image data after performing dark correction computation in a developing process (S183), and performs quick review display.

In the continuous shooting mode, performing quick review 2 display by using image data after dark correction makes it possible to make the continuous frame intervals between the first frame and the second and subsequent frames uniform and perform quick review display immediately after image pickup.

If the image display flag is canceled (S184), the process advances to step S186 without changing the OFF state of the image display unit 28. In this case, the system control circuit 50 keeps the image display unit 28 off even after image pickup, and performs no quick review display. This is a using method which need not check a pickup image immediately after image pickup and places importance on power saving without using the electronic viewfinder of the image display unit 28 as in the case wherein the user continues image pickup operation by using the optical viewfinder 104.

The system control circuit 50 then reads out image data written in the predetermined area of the memory 30, and makes the compression/decompression circuit 32 start performing an image compression process in accordance with a set mode (S186).

The system control circuit 50 records image pickup information such as an image picking up date, the Mode 1 ID of the camera, and a color effect mode at the time of image pickup in an Exif header (S186a). If there is a free image space in the image storage buffer area on the memory 30 (S187), the system control circuit 50 sequentially writes image data having undergone a compression process. The process then advances to step S189.

If there is no free space in the image storage buffer of the memory 30 (S187), the system control circuit 50 reads out the image data stored in the image storage buffer of the memory 30. The system control circuit 50 then performs a recording process of writing the readout image data in the recording medium 200 or 210 such as a memory card through the interfaces 90 and 94 and the connectors 92 and 96 (Si88). The process then advances to step S189.

Even if the system control circuit 50 performs continuous shooting of a predetermined number of frames and the image storage buffer area runs short of a free space, the system control circuit 50 can resume continuous shooting by generating a free space in the image storage buffer area by performing a recording process.

When performing a recording process in step S188, the system control circuit 50 can display a predetermined warning with an image or sound by using the image display unit 28 and the display unit 54 without posing any problem.

If the user presses the shutter switch SW2 (Sl89), the system control circuit 50 returns to step S182 to repeat a series of continuous shooting operations.

If the user releases the shutter switch SW2 (S189), the system control circuit 50 determines the state of the shutter switch SW1 (S190).

If the user presses the shutter switch SW1 (S190), the system control circuit 50 repeats the current process.

If the user releases the shutter switch SW1 (S190), the system control circuit 50 reads out the image data stored in the image storage buffer area of the memory 30. The system control circuit 50 performs a recording process of writing the readout image data in the recording medium 200 or 210 such as a memory card through the interfaces 90 and 94 and the connectors 92 and 96 (S191).

While writing image data in the recording medium 200 or 210, the system control circuit 50 displays a recording medium write access indication, e.g., blinking an LED, on the display unit 54, to clearly indicate that write access is being performed.

When the system control circuit 50 completes the recording process in step S191, the process advances to step S172 of FIG. 4A.

The system control circuit 50 determines the state of the image display flag stored in the internal memory or the memory 52 (S172). If the image display flag is set (S172), the system control circuit 50 sets the display state of the image display unit 28 to the through display state (S173). The system control circuit 50 terminates a series of image pickup operations, and returns to step S103. In this case, after checking a pickup image by quick review display on the image display unit 28, the system control circuit 50 can set the through display state wherein it sequentially displays obtained image data for the next image pickup.

If the image display flag is canceled (S172), the system control circuit 50 sets the image display of the image display unit 28 to the OFF state. The system control circuit 50 then terminates a series of image pickup operations and returns to step S103 of FIG. 2A.

<Reproducing Mode>

If determining in step S103 in FIG. 2A that the mode dial 60 is set to the reproducing mode, the system control circuit 50 advances to step S601 in FIG. 9A.

Referring to FIG. 9A, the system control circuit 50 determines the set position of the mode dial 60 and determines that the mode dial 60 is set at the power OFF position (S601), the system control circuit 50 changes the display of each image display unit 28 or 54 to the terminated state, and protects the image sensing unit by closing the barrier 102. In addition, the system control circuit 50 records flags, necessary parameters including control variables and the like, set values, and set modes on the nonvolatile memory 56. After the power control unit 80 performs predetermined termination processing, e.g., interrupting unnecessary power to the respective components of the apparatus which include the image display unit 28 (S602), the process returns to step S103. If the mode dial 60 is set at the image pickup mode position, the process returns to step S103.

The system control circuit 50 determines whether the remaining capacity or operation state of the power supply unit 86 comprising a battery and the like poses a problem in terms of the operation of the image processing apparatus 100 (S603). If there is a problem, the system control circuit 50 displays a predetermined warning with an image or sound by using the display unit 54 (S604). The process then returns to step S103 of FIG. 2A.

If there is no problem in the power supply unit 86 (S603), the system control circuit 50 determines whether the operation state of the recording medium 200 or 210 poses a problem in the operation of the image processing apparatus 100, more specifically, image data recording/reproducing operation with respect to a recording medium (S605). If there is a problem, the system control circuit 50 displays a predetermined warning with an image or sound by using the display unit 54 (S604). The process then returns to step S103 of FIG. 2A.

If there is no problem in the operation state of the recording medium 200 or 210 (S605), the process advances to step S606.

The system control circuit 50 then issues an instruction to start a DCF image retrieving process (to be described later) (S606). If it is determined after the DCF image retrieving process that there is no DCF image (S607), the system control circuit 50 performs a non-DCF image retrieving process (S611). If it is determined that there is no non-DCF image either (S612), the system control circuit 50 displays the message "there is no image" on the LCD (S613). The process then advances to step S601.

If determining in step S607 that there is a DCF image, the system control circuit 50 waits for the occurrence of a last DCF image determination event in a DCF image retrieving process to be described later (S608). If determining a last image, the system control circuit 50 issues an instruction to start a non-DCF image retrieving process (to be described later) (S609), and displays this image on the display unit (S610).

If determining in step S612 that there are only non-DCF images, the system control circuit 50 displays the last image of the non-DCF images as a display image on the display unit 54 (S610). The image display process will be described in detail later.

Upon displaying an image (S610), the system control circuit 50 waits for a user operation input (S614). If the user operates the mode dial 60 (S614), the process advances to step S601. If the user operates the left and right buttons of the operation unit 70 (S614), the system control circuit 50 displays (S616) the image determined in a next image retrieving process (S615) (to be described later). The system control circuit 50 starts waiting for user operation again (S614).

<Distance Measurement/Metering Process>

Figure 5:
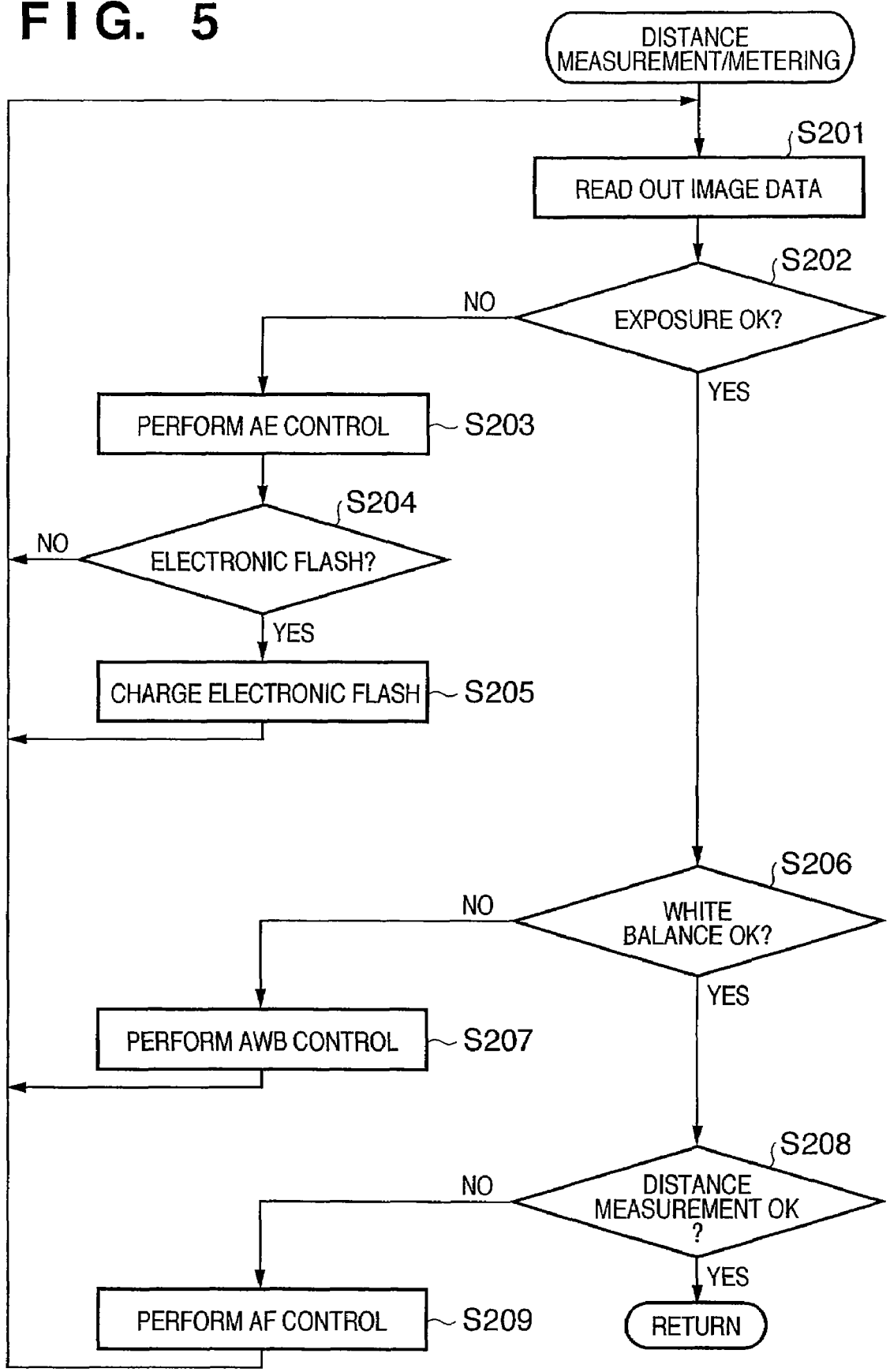
FIG. 5 is a flowchart showing a distance measurement/metering process in this embodiment.

FIG. 5 is a flowchart showing the details of a distance measurement/metering process in step S134 of FIG. 3.

The system control circuit 50 reads out a charge signal from the image sensing element 14, and the image processing circuit 20 reads out obtained image data through the A/D converter 16 (S201). The image processing circuit 20 performs predetermined computation used for an AE (Auto Exposure) process, EF (Electronic flash pre-emission) process, and AF (Auto Focus) process of the TTL (Through The Lens) system.

In each process in this case, of the total number of pixels of pickup image, the image processing circuit 20 extracts a necessary number of pixels of a specific portion corresponding to necessity and uses them for computation. This makes it possible to perform optimal computation for each of different modes, e.g., the centerweighted mode, average mode, and evaluation mode in each of the AE, EF, AWB, and AF processes of the TTL system.

The system control circuit 50 performs AE control by using the exposure control unit 40 (S203) until it is determined by using the computation result obtained by the image processing circuit 20 that exposure (AE) is proper (S202).

The system control circuit 50 determines by using the measurement data obtained by AE control whether the electronic flash is necessary (S204). If the electronic flash is necessary, the system control circuit 50 sets the electronic flash flag to charge the electronic flash 404 (S205).

If determining that the exposure (AE) is proper (S202), the system control circuit 50 stores measurement data and/or set parameters in the internal memory or the memory 52.

The system control circuit 50 performs AWB control by adjusting color process parameters using the image processing circuit 20 (S207) until determining that the white balance (AWB) is proper, by using the computation result obtained by the image processing circuit 20 and the measurement data obtained by AE control (S206).

If determining that the white balance (AWB) is proper (S206), the system control circuit 50 stores the measurement data and/or the set parameters in the internal memory or the memory 52. The system control circuit 50 then performs AF control by using the distance measurement control unit 42 and the measurement data obtained by AE control and AWB control until determining that the distance measurement (AF) result matches an in-focus state (S208).

If determining that the distance measurement (AF) result matches an in-focus state (S208), the system control circuit 50 stores the measurement data and/or the set parameters in the internal memory or the memory 52, and terminates the distance measurement/metering process routine.

<Image Pickup Process>

Figure 6:
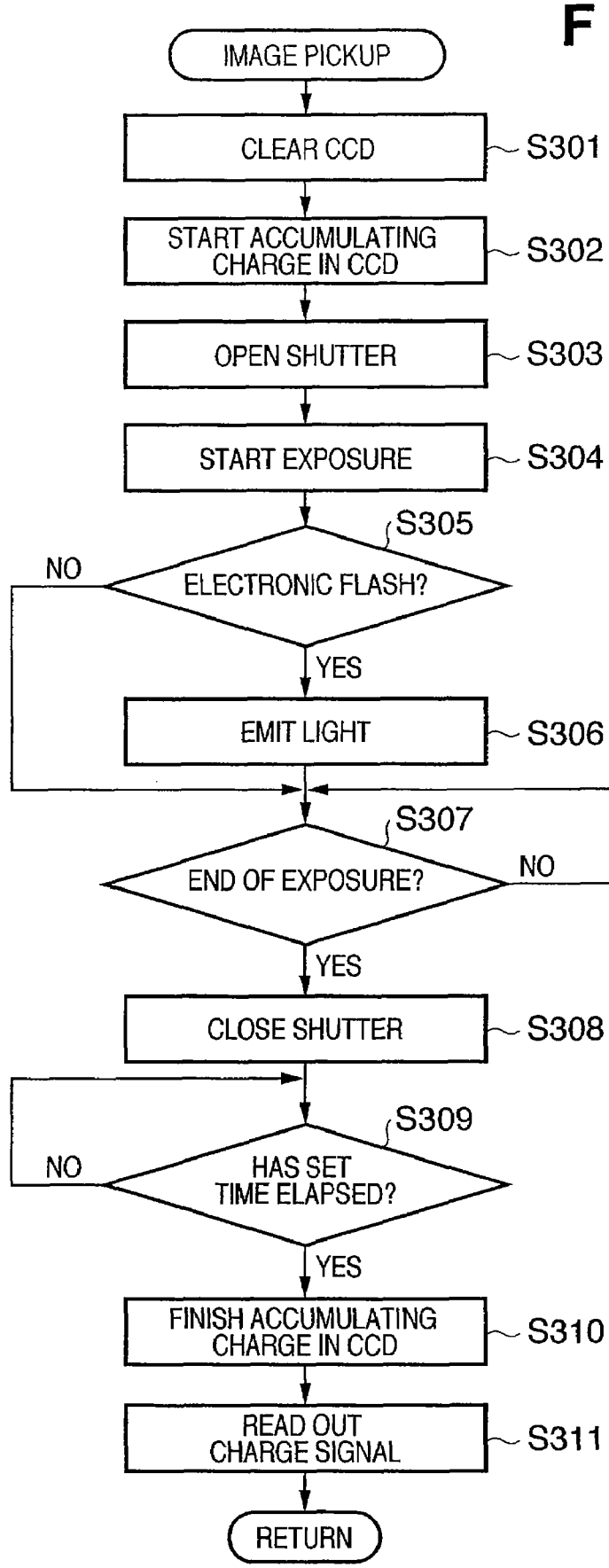
FIG. 6 is a flowchart showing an image pickup process in this embodiment.

FIG. 6 is a flowchart showing the details of an image pickup process in steps S162 and S182 in FIGS. 4A and 4B.

The system control circuit 50 clears the charge of the image sensing element 14 (S301), and then starts accumulating charge in the image sensing element 14 (S302). Thereafter, the system control circuit 50 causes the exposure control unit 40 to open the shutter 12 (S303) to start exposure by the image sensing element 14 (S304).

The system control circuit 50 determines based on an electronic flash flag whether the electronic flash 404 is necessary (S305). If determining that the electronic flash is necessary, the system control circuit 50 makes the electronic flash emit light (S306).

Note that if the electronic flash 404 cannot be used, the process advances to step S307.

The system control circuit 50 waits for the end of exposure by the image sensing element 14 in accordance with metering data (S307), causes the exposure control unit 40 to close the shutter 12 (S308), and terminates the exposure by the image sensing element 14.

If the set charge accumulation time has elapsed (S309), the system control circuit 50 terminates the charge accumulation of the image sensing element 14 (S310), and reads out a charge signal from the image sensing element 14. The system control circuit 50 then writes obtained image data in a predetermined area of the memory 30 through the A/D converter 16, image processing circuit 20, and memory control circuit 22 or writes it directly from the A/D converter 16 into the memory 30 through the memory control circuit 22 (S311).

When the series of processes is complete, the system control circuit 50 terminates the image pickup process routine.

<Dark Capture Process>

Figure 7:
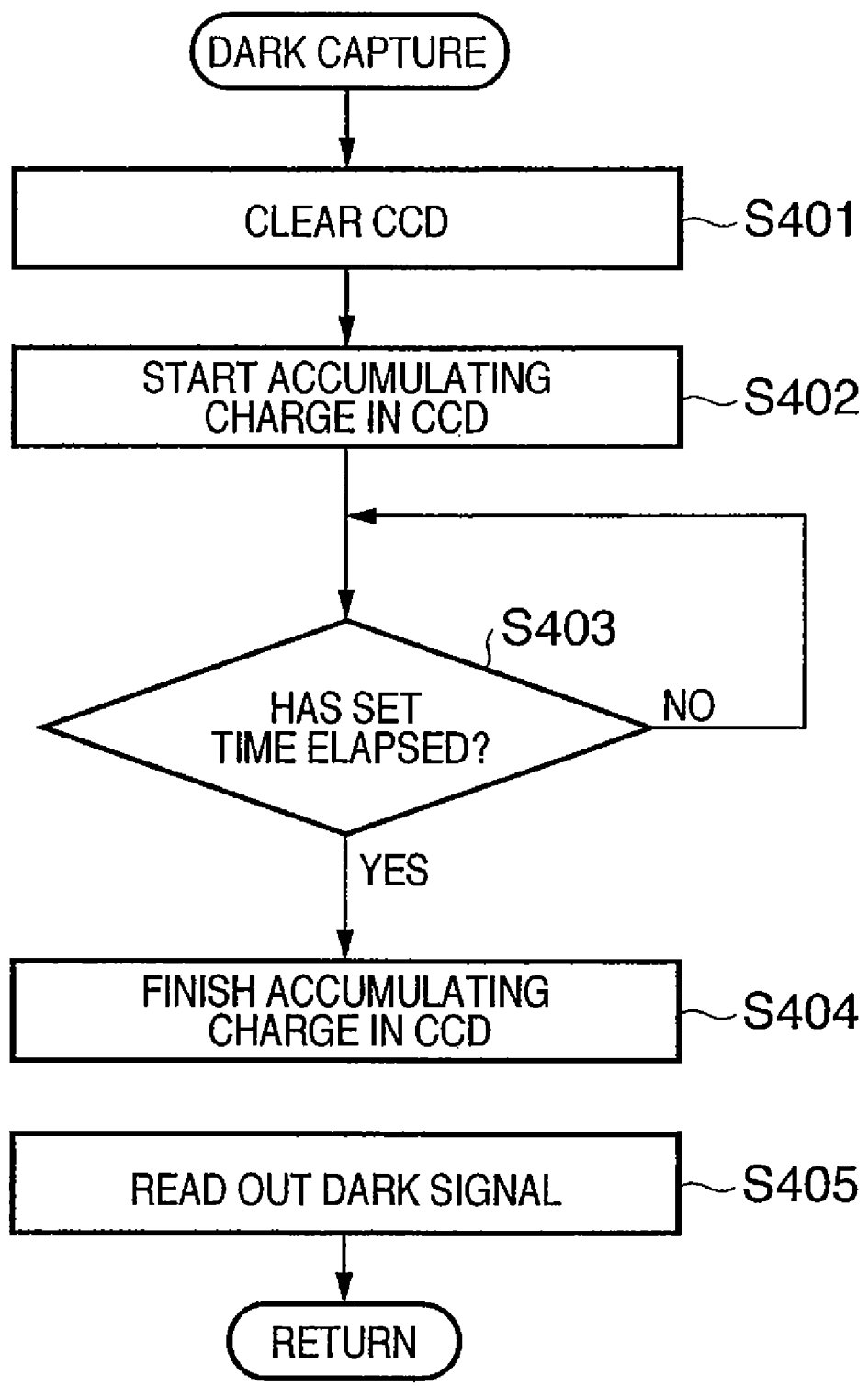
FIG. 7 is a flowchart showing a dark capture process in this embodiment.

FIG. 7 is a flowchart showing the details of the dark capture processes in steps S165 and S181 in FIGS. 4A and 4B.

The system control circuit 50 clears the charge of the image sensing element 14 (S401), and then starts accumulating charge into the image sensing element 14 while the shutter 12 is closed (S402).

If a predetermined charge accumulation time has elapsed (S403), the system control circuit 50 finishes the charge accumulation of the image sensing element 14 (S404), and then reads out a charge signal from the image sensing element 14. The system control circuit 50 writes image data (dark image data) in a predetermined area of the memory 3Q through the A/D converter 16, image processing circuit 20, and memory control circuit 22, or writes it directly from the A/D converter 16 into the predetermined area through the memory control circuit 22 (S405).

Performing a developing process by using this dark capture data makes it possible to correct the image quality deterioration of the obtained image data, e.g., pixel omission due to dark current noise produced in the image sensing element 14 or a flaw unique to the image sensing element 14.

Note that the system control circuit 50 newly performs a dark capture process for this dark image data or holds the data in a predetermined area of the memory 30 until the power supply of the image processing apparatus 100 is turned off.

In addition, part or all of the memory 30 comprises a nonvolatile memory such as an EEPROM or a hard disk, and the dark image data is written in the nonvolatile memory. This arrangement allows the system control circuit 50 to hold this dark image data in the predetermined area of the nonvolatile memory until a dark capture process is newly performed.

Subsequently, the system control circuit 50 executes an image pickup process for this dark image data, and reads out the obtained image data from the image sensing element 14. The system control circuit 50 uses this data for a developing process.

Upon completing the series of processes, the system control circuit 50 terminates the dark capture process routine.

<Developing Process>

Figure 8:
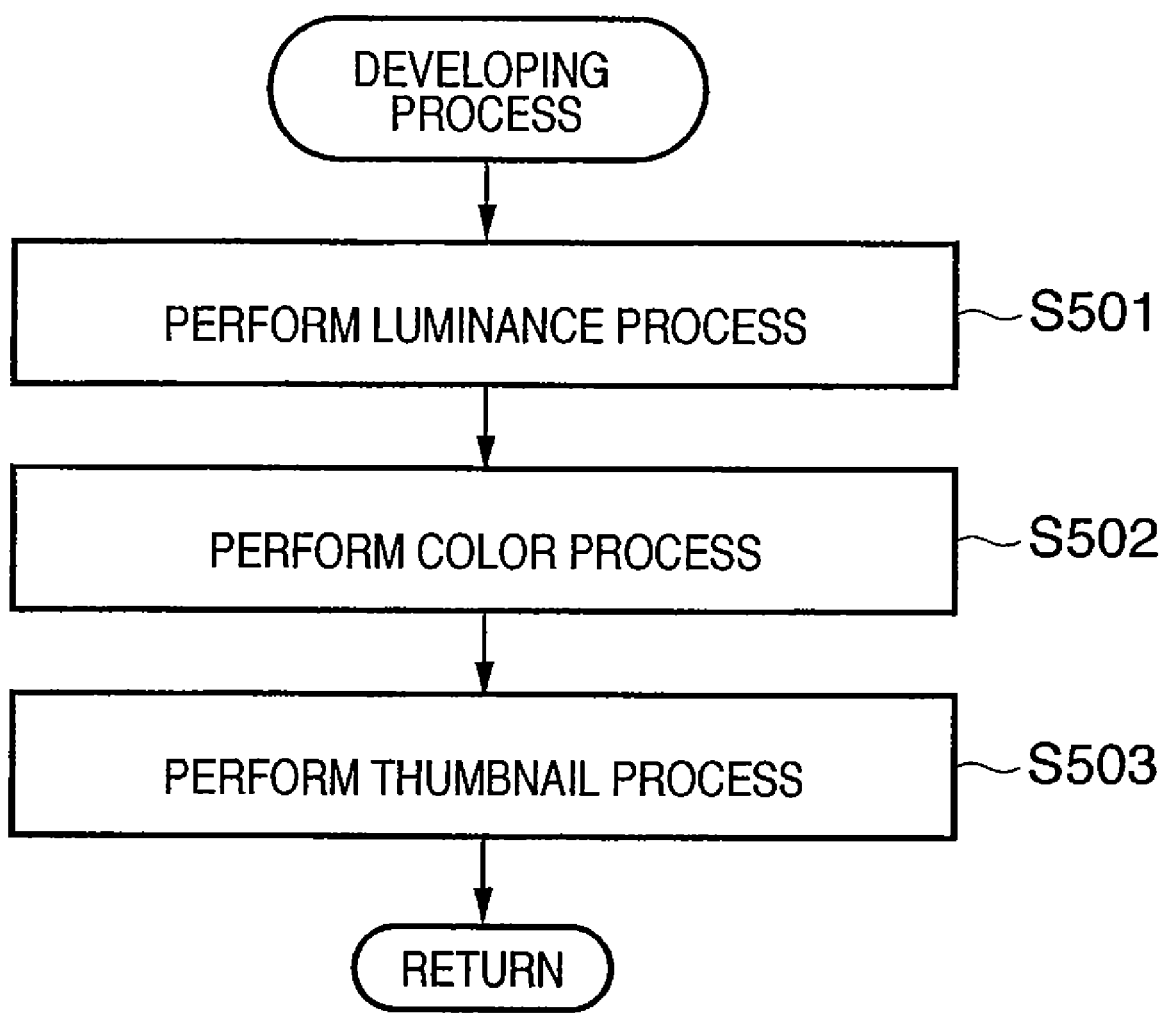
FIG. 8 is a flowchart showing a developing process in this embodiment.

FIG. 8 is a flowchart showing the details of the developing processes in steps S166 and S183 in FIGS. 4A and 4B.

The system control circuit 50 reads out the obtained image data and captured dark image data written in the memory 30, and sequentially performs a luminance signal process (S501), a color process based on the set color effect mode (S502), and a thumbnail image process (S503). Thereafter, the system control circuit 50 writes the processed image data in the memory 30.

Upon completing the series of processes, the system control circuit 50 terminates the developing process routine.

<Image Display Process>

Figure 9B:
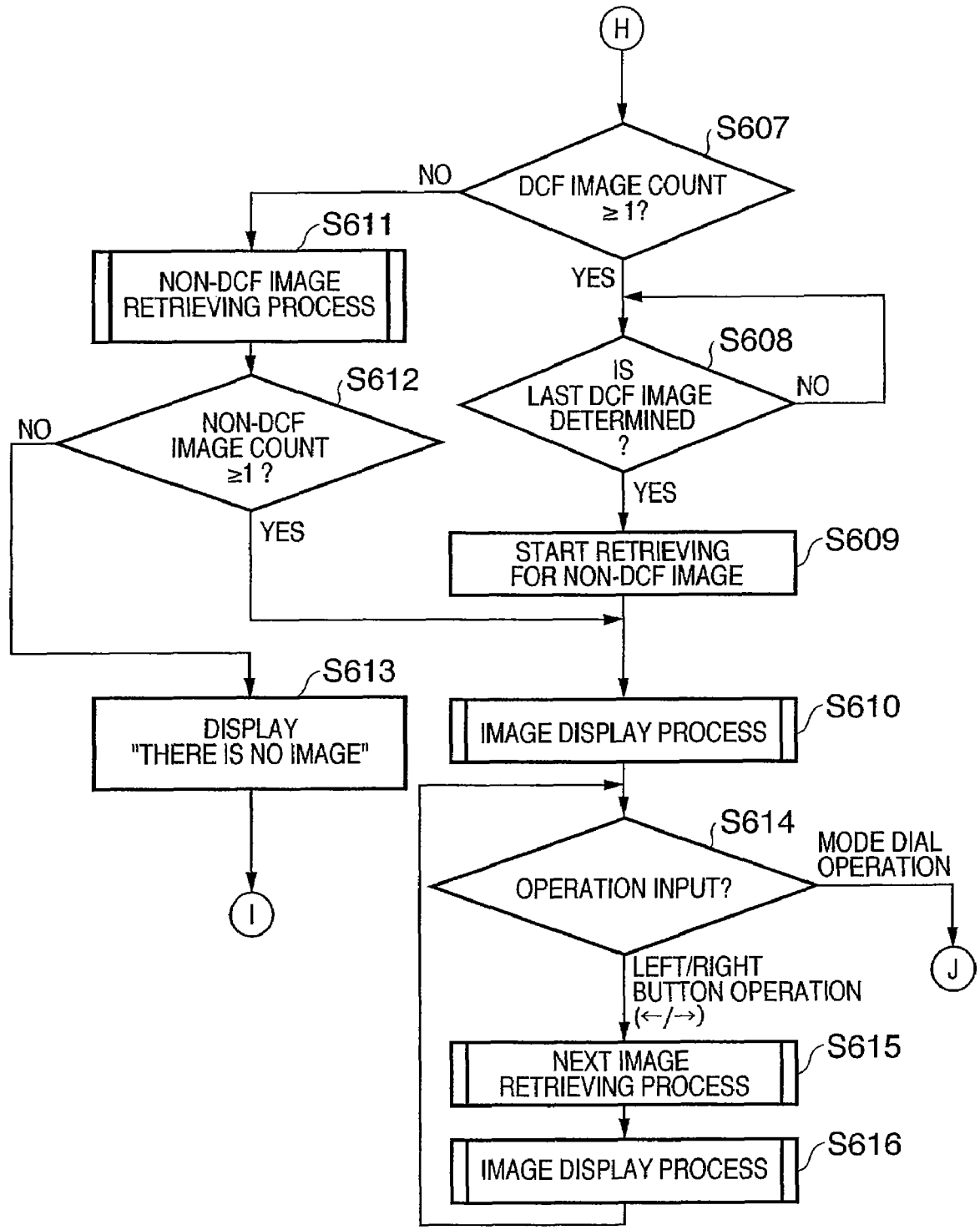
Figure 10:
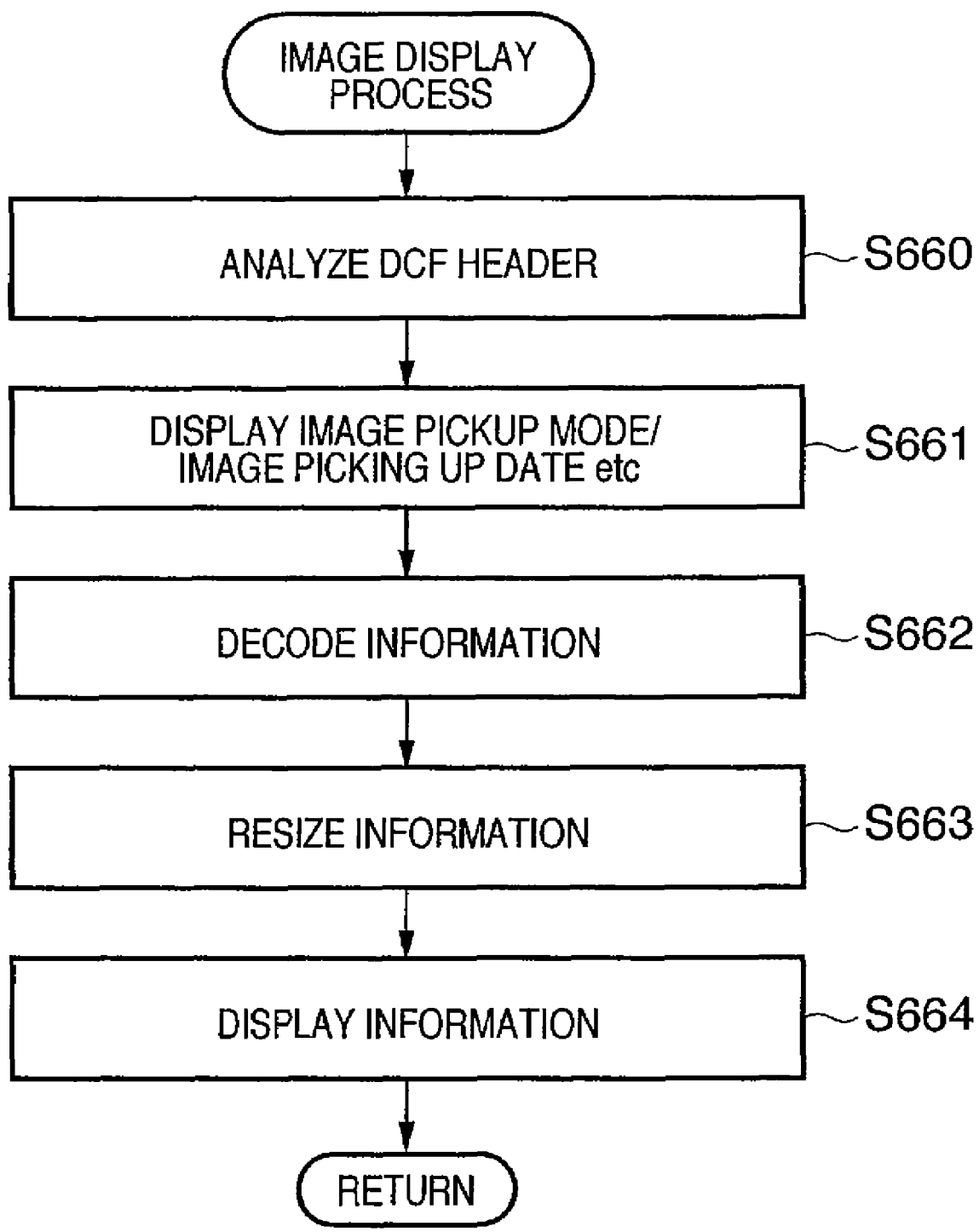
FIG. 10 is a flowchart showing an image display process in this embodiment.

FIG. 10 is a flowchart showing the details of the image display processes in steps S610 and S616 in FIG. 9B.

The system control circuit 50 analyzes the Exif information in a DCF header (S660) The system control circuit 50 acquires information such as an image pickup mode, an image picking up date, an image size, and the Model ID of the camera, and displays the image pickup mode/image picking up date/image size on the display unit 54 (S661). In addition, the system control circuit 50 causes the compression/decompression circuit 32 to perform JPEG decompression (S662), resizes the data in accordance with the display VRAM size (S663), and displays the resultant data on the display unit 54 (S664).

<DCF Image Retrieving Process>

Figure 11A:
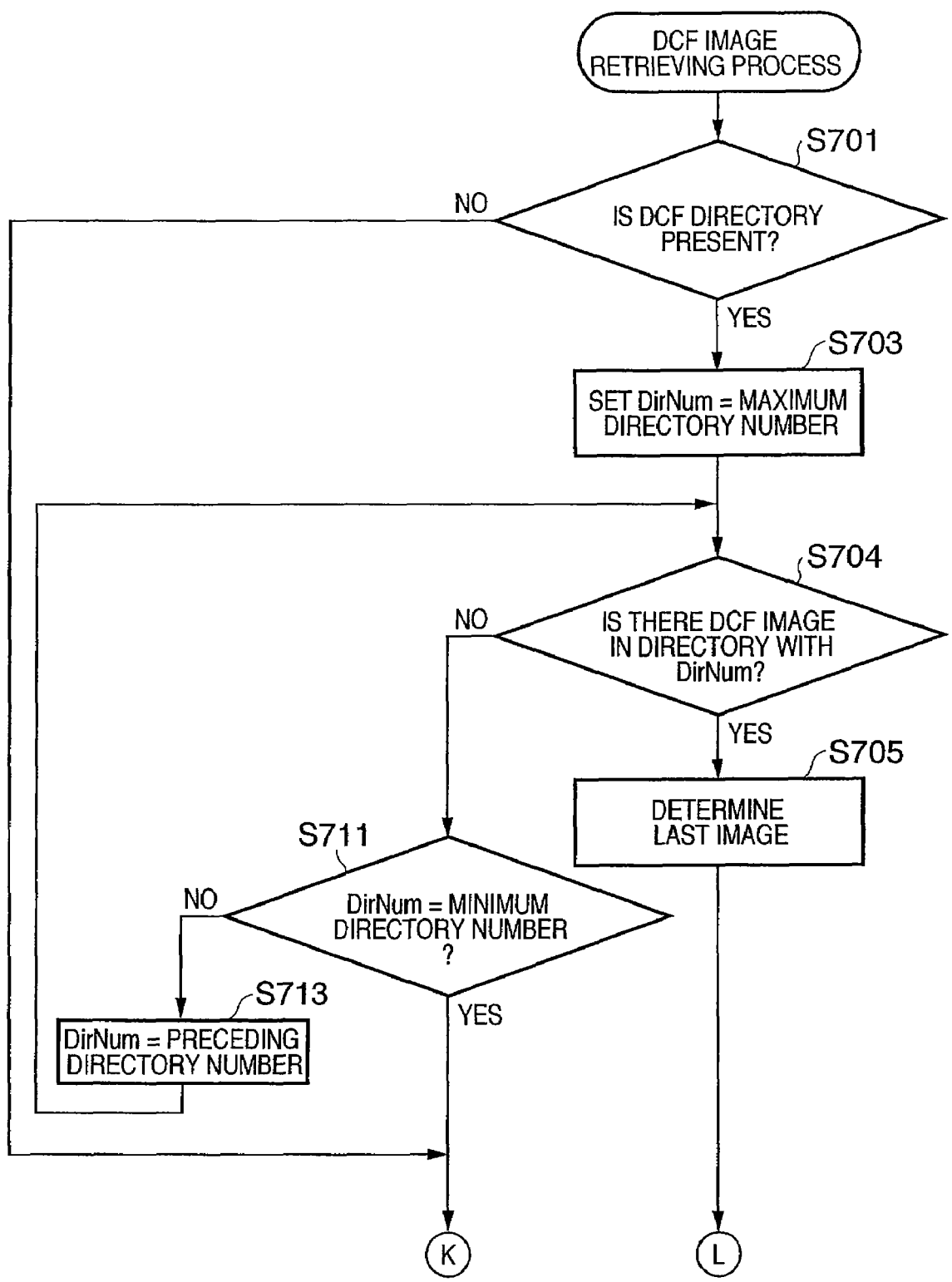
FIGS. 11A and 11B are flowcharts showing a DCF image retrieving process in this embodiment.
Figure 11B:
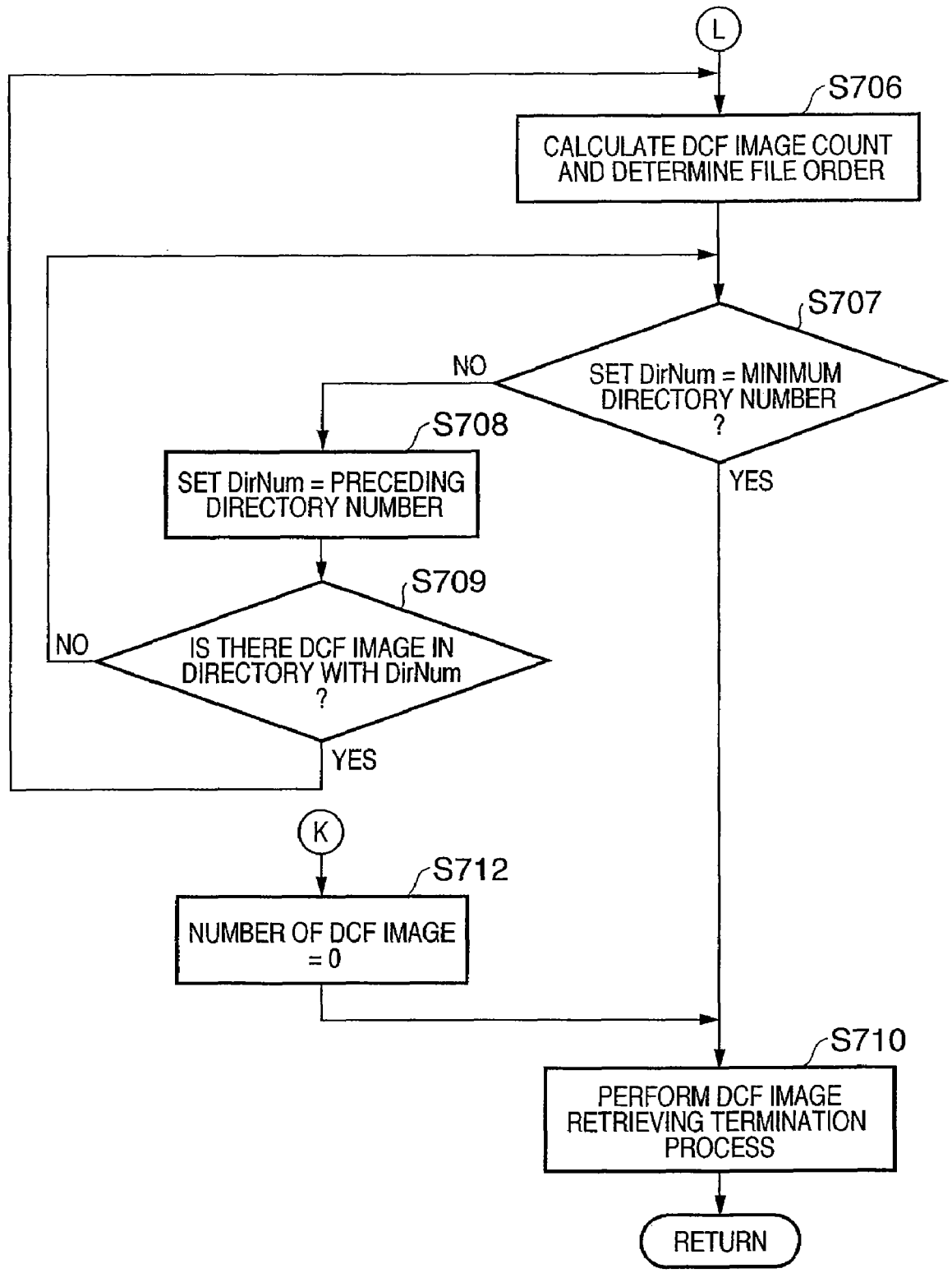

FIGS. 11A and 11B are flowcharts showing the details of the DCF image retrieving process which the system control circuit 50 issues an instruction to start in step S606 in FIG. 9A.

If determining that there is no DCF directory in the recording unit 202 or 212 (S701), the system control circuit 50 sets the DCF image count to 0 (S712), and performs an image retrieving termination process of, for example, setting a retrieving end flag, and issuing a retrieving end event (S710). In this case, a DCF directory is a directory standardized in the form "/DCIM/xxxYYYY", where xxx is a directory number which is a numerical character string ranging from 100 to 999, and YYYY is represented by an ASCII character string.

If determining that there is a DCF directory (S701), the system control circuit 50 sets the maximum directory number in the recording unit to a variable DirNum (S703).

The system control circuit 50 then determines whether there is an image in the DCF directory having DirNum (S704). If determining that there is no image (S704), the system control circuit 50 determines whether currently set DirNum is the minimum directory number in the recording unit (S711). If DirNum is not the minimum directory number (S711), the system control circuit 50 sets the next directory number, of the DCF directories existing in the recording unit, in the descending order of directory numbers to DirNum (S713). The process returns to step S704.

If determining in step S704 that there is an image, the system control circuit 50 determines the image as the last image (S705). The system control circuit 50 transfers this last image determination information to step S608 of FIG. 9B with a flag, an event, or the like. At the same time, the system control circuit 50 determines the total number and reproducing order of DCF image files existing in the DCF director with DirNum (S706). In this case, the reproducing order generally coincides with the order of file numbers written on the file names defined by the DCF standard. Note that each DCF image file is represented by the form "YYYYZZZZ.JPG", where YYYY is an ASCII character string, and ZZZZ is a numerical character string ranging from 1001 to 9999.

If DirNum is not the minimum directory number in the recording unit (S707), the system control circuit 50 sets the next directory number in the descending order of directory numbers to DirNum (S708), and determines the presence/absence of a DCF image (S709). If there is no DCF image, the process returns to step S707. If there is a DCF image, the process returns to step S706. If determining in step S707 that retrieving is complete up to the minimum directory number, the system control circuit 50 finishes DCF image retrieving (S710), and terminates the processing.

As described above, if a specific directory structure, directory names, and file names are defined as in the DCF standard, the system control circuit 50 can determine an image to be displayed, the last image in this case, without retrieving for all directories and files.

<Non-DCF Image Retrieving Process>

Figure 12:
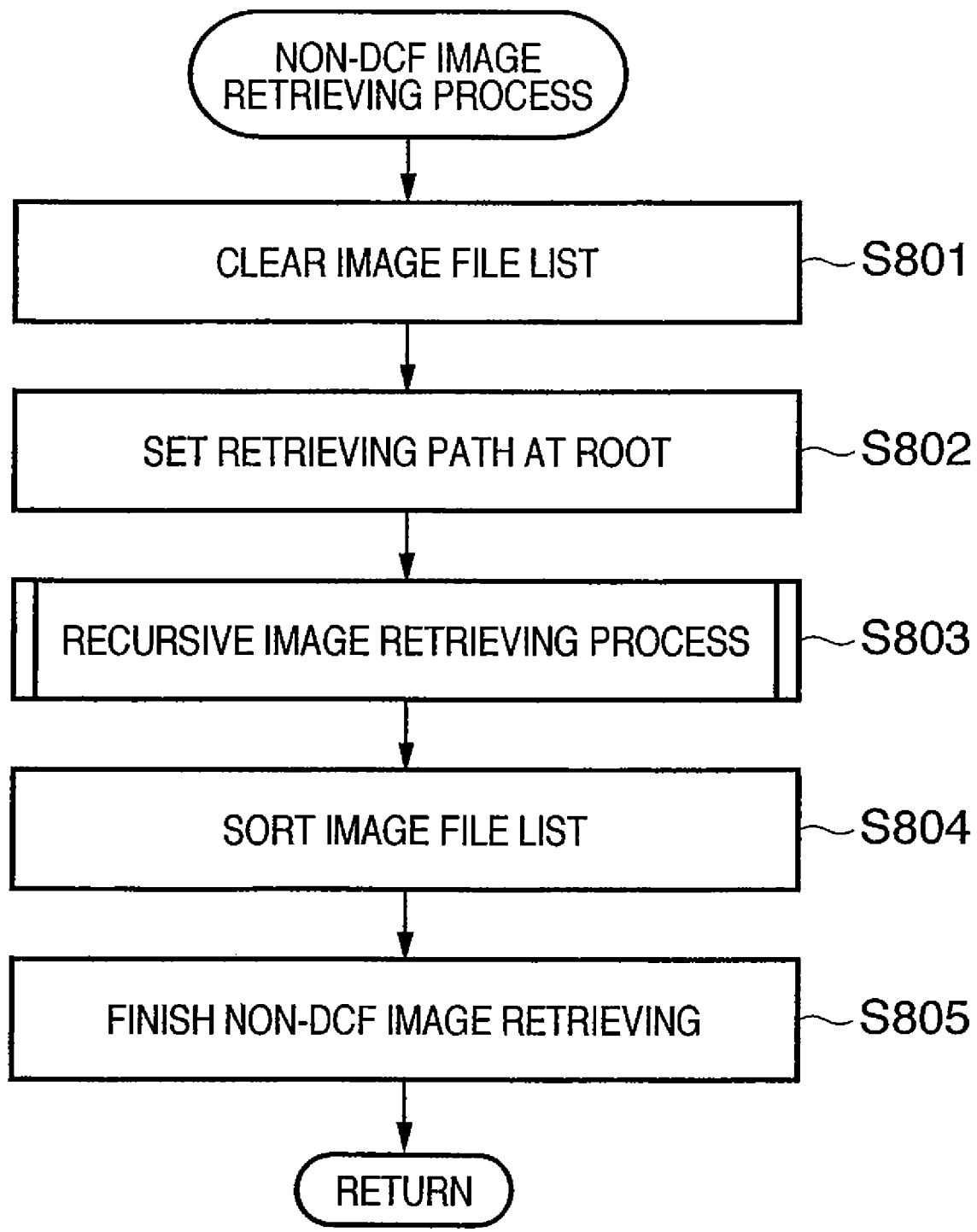
FIG. 12 is a flowchart showing a non-DCF image retrieving process in this embodiment.

FIG. 12 is a flowchart showing the details of a non-DCF image retrieving process which the system control circuit 50 issues an instruction to start in step S609 or executes in step S611 in FIG. 9B.

First of all, the system control circuit 50 clears an image file list which manages images other than DCF images (S801). As described later, this image file list is also used for a rearrangement process for determining the reproducing order of retrieved images. In addition, the system control circuit 50 sets a retrieving start path in the root directory of the recording unit (S802).

The system control circuit 50 then performs a recursive retrieving process (S803) to be described later to extract non-DCF images in the recording unit, and rearranges the image file list having undergone extraction in a predetermined order, e.g., the time stamp order or the file path order (S804). Thereafter, the system control circuit 50 performs an image retrieving termination process (S805) of setting a retrieving end flag, issuing a retrieving end event, and the like and terminates the processing.

<Recursive Image Retrieving Process>

Figure 13:
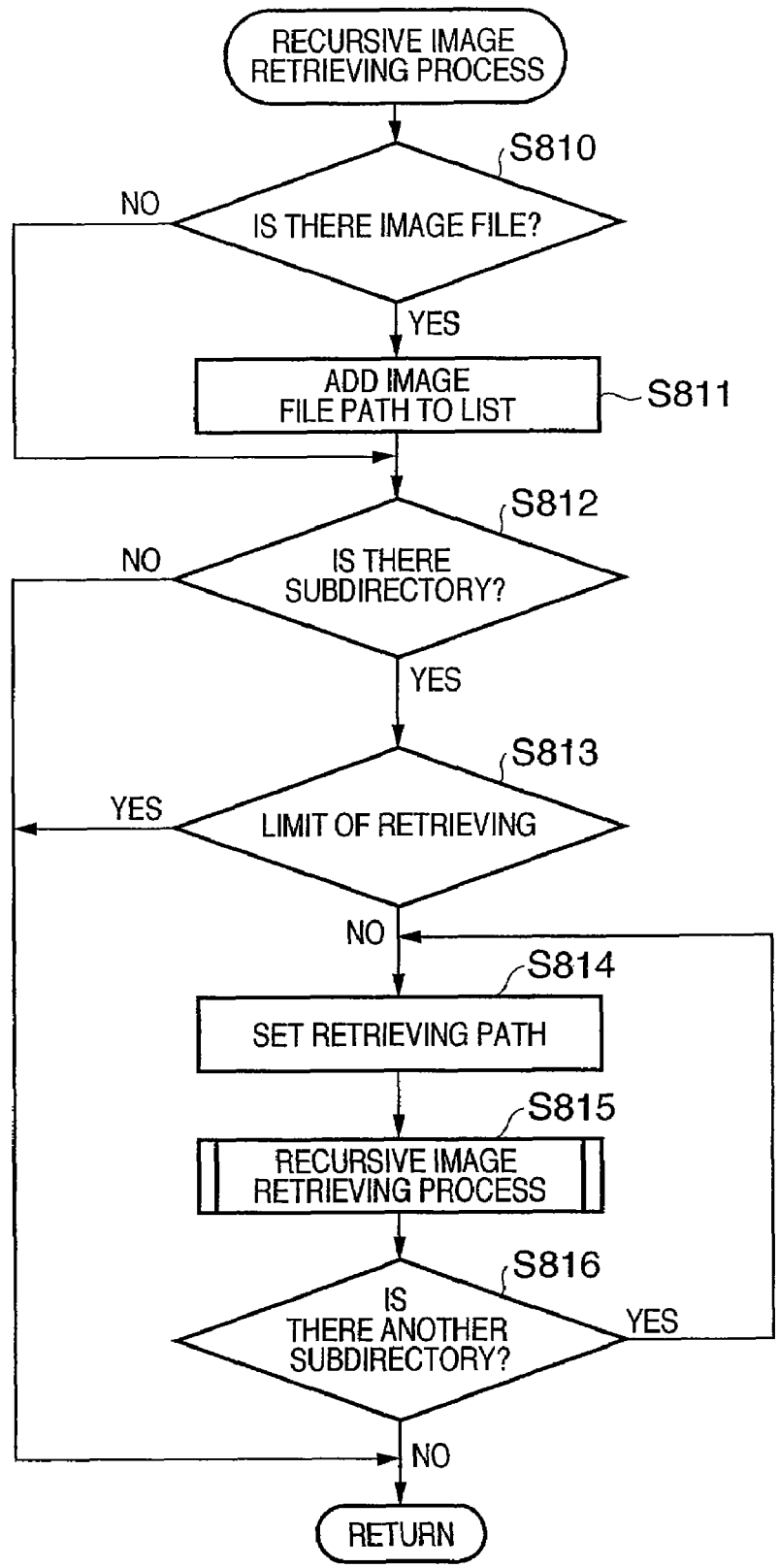
FIG. 13 is a flowchart showing a recursive image retrieving process in this embodiment.

FIG. 13 is a flowchart showing the details of the recursive image retrieving process in step S803 of FIG. 12.

The system control circuit 50 checks the presence/absence of an image file in a directory of an already set retrieving path (S810). If there is an image file, the system control circuit 50 adds this file path to the list (S811).

The system control circuit 50 checks the presence/absence of a subdirectory on the retrieving path (S812). In this case, since the system control circuit 50 extracts DCF images in the above DCF image retrieving process, the DCF directory is excluded from retrieve targets. If the system control circuit 50 determines that there is no subdirectory, the process exits the loop. If determining that there is a subdirectory, the system control circuit 50 starts retrieving the subdirectory.

The system control circuit 50 determines whether the retrieving process has reached its limit in terms of, for example, the memory capacity restriction or specifications of the device, e.g., the number of directory layers to be retrieved or the number of files to be added to the list has reached its upper limit (S813). If the system control circuit 50 determines that such number has reached the upper limit, the process exits the loop.

If determining that the retrieving process has reached its limit, the system control circuit 50 sets the retrieved path as a subdirectory and recursively performs a recursive image retrieving process for the new retrieving start path (S814 and S815). If the recursive image retrieving process for the subdirectory is complete and the same directory layer includes another subdirectory, the system control circuit 50 also retrieves the subdirectory (S816).

In order to rearrange an image group, for which no specific directory structure such as a DCF directory structure is defined, in accordance with a specific rule, the system control circuit 50 needs to acquire in advance the paths of all the image files of the image group which are to be handled.

<Next Image Retrieving Process>

Figure 14:
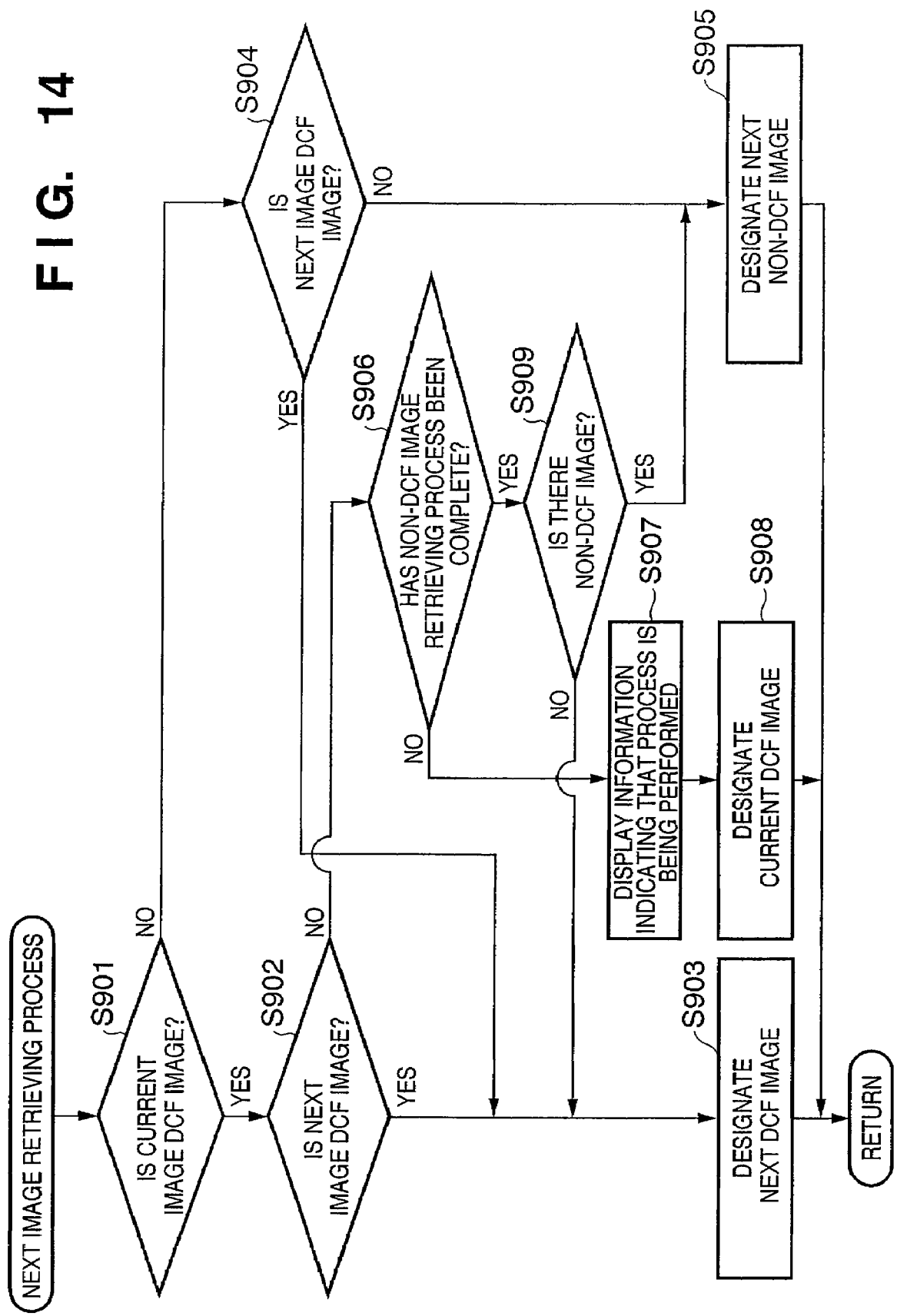
FIG. 14 is a flowchart showing a next-image retrieving process in this embodiment.

FIG. 14 is a flowchart showing the details of a next image retrieving process in step S615 in FIG. 9B.

If the current image is not a DCF image (S901), i.e., the current image is a non-DCF image, since non-DCF image retrieving has already been complete as described above, the system control circuit 50 determines whether the next image is a DCF image (S904).

If determining that the next image is a DCF image (S904), the system control circuit 50 sets the next DCF image as the image to be reproduced next (S903). The process then exits the loop.

If determining in step S904 that the next image is not a DCF image, the system control circuit 50 designates the next non-DCF image. The process then exits the loop (S905).

If determining in step S901 that the current image is a DCF image, the system control circuit 50 determines whether the next image is a DCF image (S902). If determining that the next image is a non-DCF image, the system control circuit 50 checks whether the non-DCF image has already been retrieved (S906). If this image is being retrieved, the system control circuit 50 displays information indicating that the image is being displayed (S907) and designates the current DCF image (S908). The process then exits the loop. That is, the displayed image at this point of time does not change.

If determining in step S906 that non-DCF image retrieving has been complete and there is a non-DCF image (S909), the system control circuit 50 sets the next image as the next non-DCF image and exits the process (s905). If determining in step S909 that there is no non-DCF image, the system control circuit 50 designates a next DCF image (S903) and exits the process.

If determining in step S902 that the next image is a DCF image, the system control circuit 50 designates a next DCF image (S903) and exits the process.

<Another Example of Next Image Retrieving Process>

Figure 15:
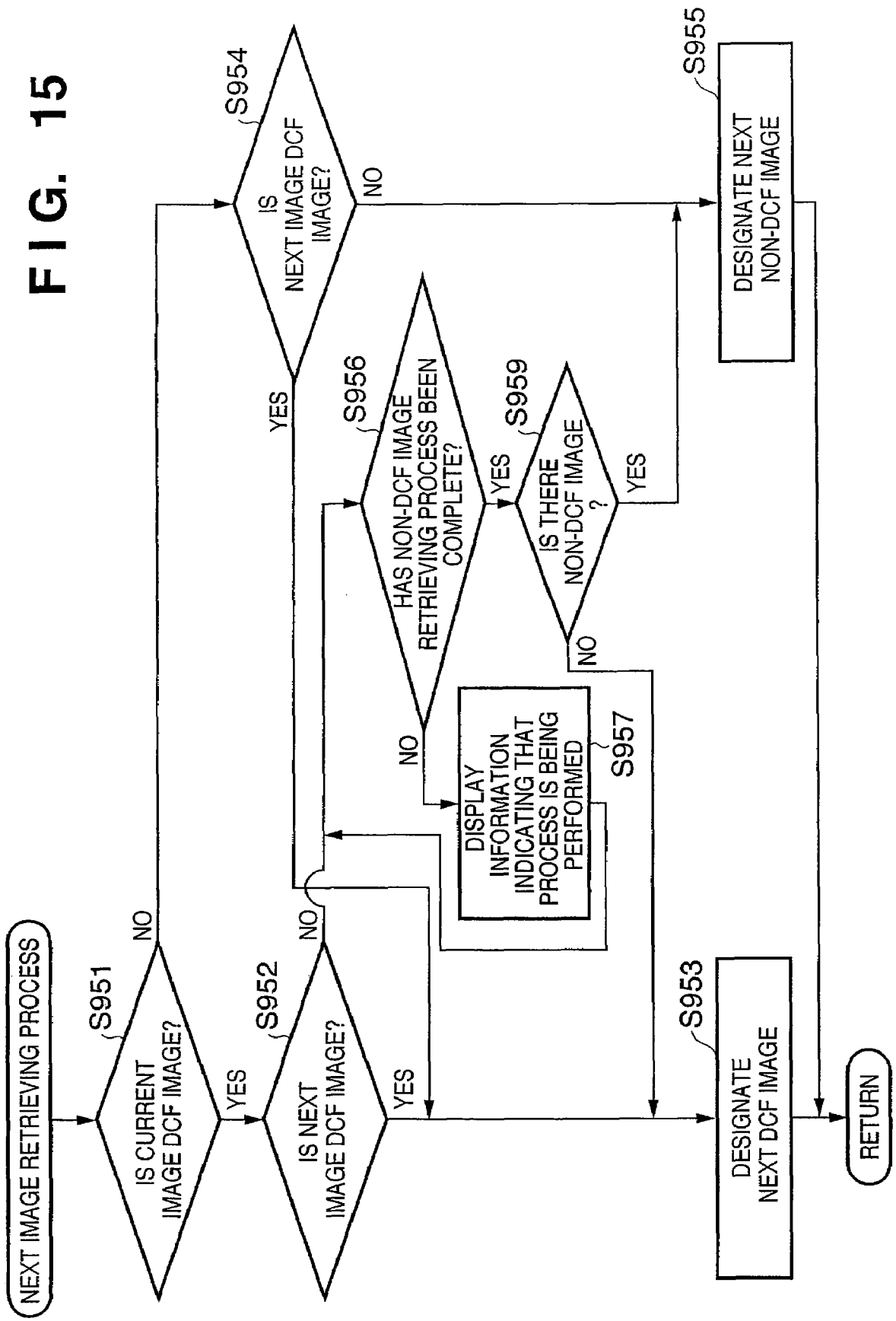
FIG. 15 is a flowchart showing another next-image retrieving processing in this embodiment.

FIG. 15 is a detailed flowchart showing another example of the next image retrieving process in step S615 in FIG. 9B.

If the current image is not a DCF image (S951), i.e., the current image is a non-DCF image, since non-DCF image retrieving has already been complete, the system control circuit 50 determines whether the next image is a DCF image (S954).

If determining that the next image is a DCF image (S954), the system control circuit 50 sets the image to be reproduced next as the next DCF image (S953) and exits the process.

If determining in step S954 that the next image is not a DCF image, the system control circuit 50 designates a next non-DCF image and exits the process (S955).

If determining in step S951 that the current image is a DCF image, the system control circuit 50 determines whether the next image is a DCF image (S952). If determining that the next image is a non-DCF image, the system control circuit 50 checks whether non-DCF image retrieving has been complete (S956). If determining that retrieving is under way, the system control circuit 50 displays information indicating that retrieving is under way until the end of retrieving in step S956 (S957).

If determining in step S956 that non-DCF image retrieving has been complete and there is a non-DCF image (S959), the system control circuit 50 sets the next image as the next non-DCF image and exits the process (S955). If determining in step S959 that there is no non-DCF image, the system control circuit 50 designates a next DCF image (S953) and exits the process.

If determining in step S952 that the next image is a DCF image, the system control circuit 50 designates a next DCF image (S953) and exits the process.

As described above, in this embodiment, the apparatus preferentially retrieves for a DCF image group and reproduces them in the reproducing mode. In addition, the apparatus separately retrieves for a DCF image group and other image groups and determines the reproducing order of them. This makes it possible to reproduce images nonconforming to the DCF standard, e.g., images copied by the user, as well as DCF images. In addition, this allows the user to quickly perform image feeding operation, and makes it possible to perform processing without making the user be conscious of the retrieving time even in reproducing all the images in a recording medium.

In addition, this apparatus determines a reproducing order so as to reproduce first one of a DCF image group and another image group and then reproduce the other image group. This makes it possible to reproduce even images nonconforming to the DCF standard as well as reproducing DCF images altogether.

Using different methods of determining a reproducing order for each image group makes it possible to reproduce each image group in a proper reproducing order.

This also makes it possible to reproduce a DCF image group in a reproducing order determined by a directory name rule and file name rule conforming to the DCF standard and reproduce an image group nonconforming to the DCF standard in a reproducing order based on a name order, a chronological order, or the like.

In addition, since this apparatus can perform image feeding operation when determining the reproducing order of one of a DCF image group and other image groups, the apparatus can reproduce images, the reproducing order of which can be determined without retrieving for all directories as in the case of DCF images and image feeding operation. This can also acquire all pieces of information of an image group nonconforming to the DOCF standard and determine a reproducing order of them while reproducing DCF images.

Assume that the user tries to execute image feeding operation over a DCF image group and a non-DCF image group. In this case, if DCF image group retrieving has not been complete and no reproducing order has not been determined, the apparatus inhibits image feeding operation and displays a warning. This makes it possible to prevent image feeding operation in an indeterminate state.

[Other Embodiment]

The present invention incorporates a case wherein computer programs for implementing the functions of the embodiment described above are directly or remotely supplied to a system or apparatus. In this case, the computer of the system or the like reads out and executes the computer programs.

The computer programs themselves therefore which are installed in the computer to allow the computer to implement the functions/processing of the present invention also implement the present invention.

In this case, each program may take any form, e.g., an object code, a program executed by an interpreter, and script data supplied to an OS, as long as it has the function of the program.

As a recording medium (storage medium) for supplying the programs, a flexible disk, hard disk, optical disk, or magnetooptical disk is available. In addition, MO, CD-ROM, CD-R, CD-RW, magnetic tape, nonvolatile memory card, ROM, DVD (DVD-ROM or DVD-R), or the like is available.

In addition, methods of supplying the programs include the following. A client computer connects to a homepage on the Internet by using a browser to download each computer program of the present invention itself from the homepage or download a compressed file containing an automatic install function into a recording medium such as a hard disk. Alternatively, the programs can be supplied by dividing the program codes constituting each program of the present invention into a plurality of files, and downloading the respective files from different homepages. That is, the present invention also incorporates a WWW server which allows a plurality of users to download program files for causing the computer to execute the functions/processing of the present invention.

In addition, the programs can be supplied by encrypting the programs of the present invention, storing the encrypted data in storage media such as CD-ROMS, distributing them to users, and allowing users who satisfy a predetermined condition to download key information for decryption from a homepage through the Internet. In this case, the present invention is implemented by executing the encrypted programs using the key information and making a computer install the programs.

The functions of the above embodiment are implemented not only when the readout programs are executed by the computer but also when the OS running on the computer performs part or all of actual processing based on the instructions of the programs.

The functions of the above embodiment are also implemented when the programs read out from the recording medium are written in the memory of a function expansion board inserted into the computer or a function expansion unit connecting to the computer, and the CPU of the function expansion board or function expansion unit performs part or all of actual processing based on the instructions of the programs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-038482, filed Feb. 15, 2006, which is hereby incorporated by reference herein in its entirety.

What is claimed is:

1. An image reproducing apparatus which reproduces image files stored in a recording medium, wherein the recording medium stores a first image group recorded in accordance with a first file rule and a second image group nonconforming to the first file rule, and which performs a process of determining a reproducing order for image files when a power is turned on in a reproducing mode, the apparatus comprising:
a first determination unit configured to determine the reproducing order for all image files belonging to the first image group;
a display control unit configured to control a display device to display the image files of which the reproducing order is determined by the first determination unit;
a second determination unit configured to determine the reproducing order for image files belonging to the second image group after the first determination unit determines the reproducing order for the first image group;
an instruction unit configured to input an instruction for changing an image to be displayed on the display device; and
a control unit configured to control an image to be displayed on the display device based on the reproducing order for the first image group determined by the first determination unit and the reproducing order for the second image group determined by the second determination unit in accordance with the instruction input by the instruction unit,
wherein when an instruction is input for changing a displayed image to an image belonging to the second image group by the instruction unit after an image belonging to the first image group have been displayed by the display control unit, the control unit controls the display control unit not to display the image belonging to the second image group if the second determination unit is in process of retrieving the image files belonging to the second image group.

2. The apparatus according to claim 1, wherein when an instruction is input for changing a displayed image to an image belonging to the second image group by the instruction unit after an image belonging to the first image group have been displayed by the display control unit, the control unit controls the display control unit not to display the image belonging to the second image group if the reproducing order of the second image group have not been determined yet by the second determination unit and wait until the reproducing order of the second image group is determined by the second determination unit, and controls the display control unit in accordance with the instruction input by the instruction unit in response to that the reproducing order of the second image group is determined by the second determination unit.

3. The apparatus according to claim 1, wherein the first image group includes identification numbers determined by a directory name rule and a file name rule which conform to a design rule for camera file system, and
the second image group includes identification numbers determined by a directory order and a file order.

4. A control method for an image reproducing apparatus which reproduces image files stored in a recording medium, wherein the recording medium stores a first image group recorded in accordance with a first file rule and a second image group nonconforming to the first file rule, and which performs a process of determining a reproducing order for image files when a power is turned on in a reproducing mode, the method comprising:
a first determination step of determining the reproducing order for all image files belonging to the first image group;
a display control step of controlling a display unit to display the image files of which the reproducing order is determined in the first determination step;
a second determination step of determining the reproducing order for image files belonging to the second image group after the reproducing order for the first image group is determined in the first determination step;
an instruction step of inputting an instruction for changing an image to be displayed on the display unit; and
a control step of controlling an image to be displayed on the display device based on the reproducing order for the first image group determined in the first determination step and the reproducing order for the second image group determined in the second determination step in accordance with the instruction input in the instruction step,
wherein when an instruction is input for changing a displayed image to an image belonging to the second image group in the instruction step after an image belonging to the first image group have been displayed in the display control step, in the control step the image to be displayed on the display unit is controlled so as not to display the image belonging to the second image group if the second determination step is in process of retrieving the image files belonging to the second image group are in process of being retrieved.

5. The method according to claim 4, wherein when an instruction is input for changing a displayed image to an image belonging to the second image group in the instruction step after an image belonging to the first image group have been displayed in the display control step, the image to be displayed on the display unit is controlled so as not to display the image belonging to the second image group if the reproducing order of the second image group have not been determined yet in the second determination step and so as to wait until the reproducing order of the second image group is determined in the second determination step and display the image to be displayed in accordance with the instruction input in the instruction step in response to that the reproducing order of the second image group is determined in the second determination unit.

6. The method according to claim 4, wherein
the first image group includes identification numbers determined by a directory name rule and a file name rule which conform to a design rule for camera file system, and
the second image group includes identification numbers determined by a directory order and a file order.

* * * * *